Oct. 2, 1956 J. F. WELLEKENS 2,765,005
APPARATUS FOR DISPENSING BEVERAGES
Filed July 19, 1951 19 Sheets-Sheet 2
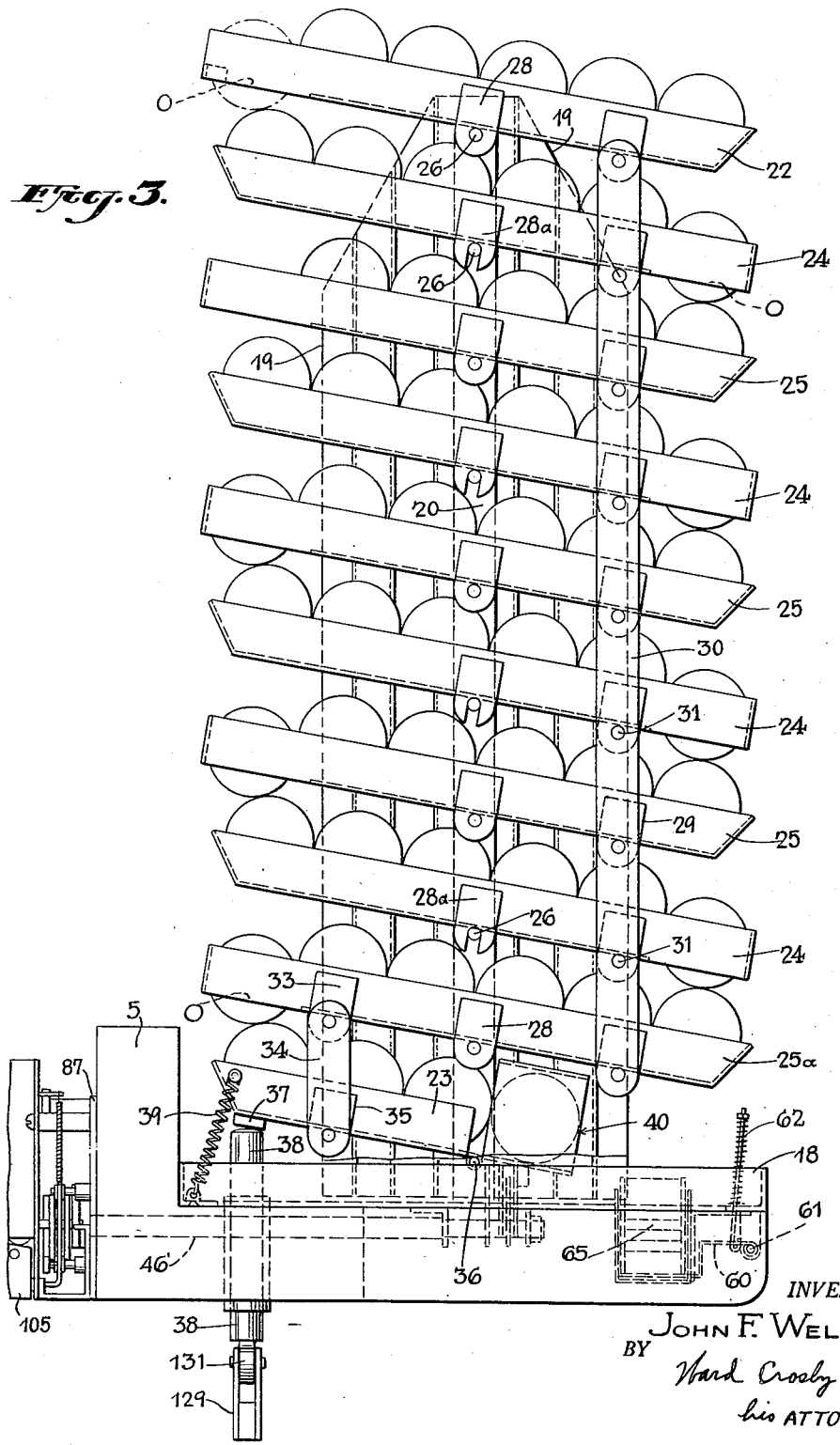
INVENTOR.
JOHN F. WELLEKENS.
BY Ward Crosby &neal
his ATTORNEYS.

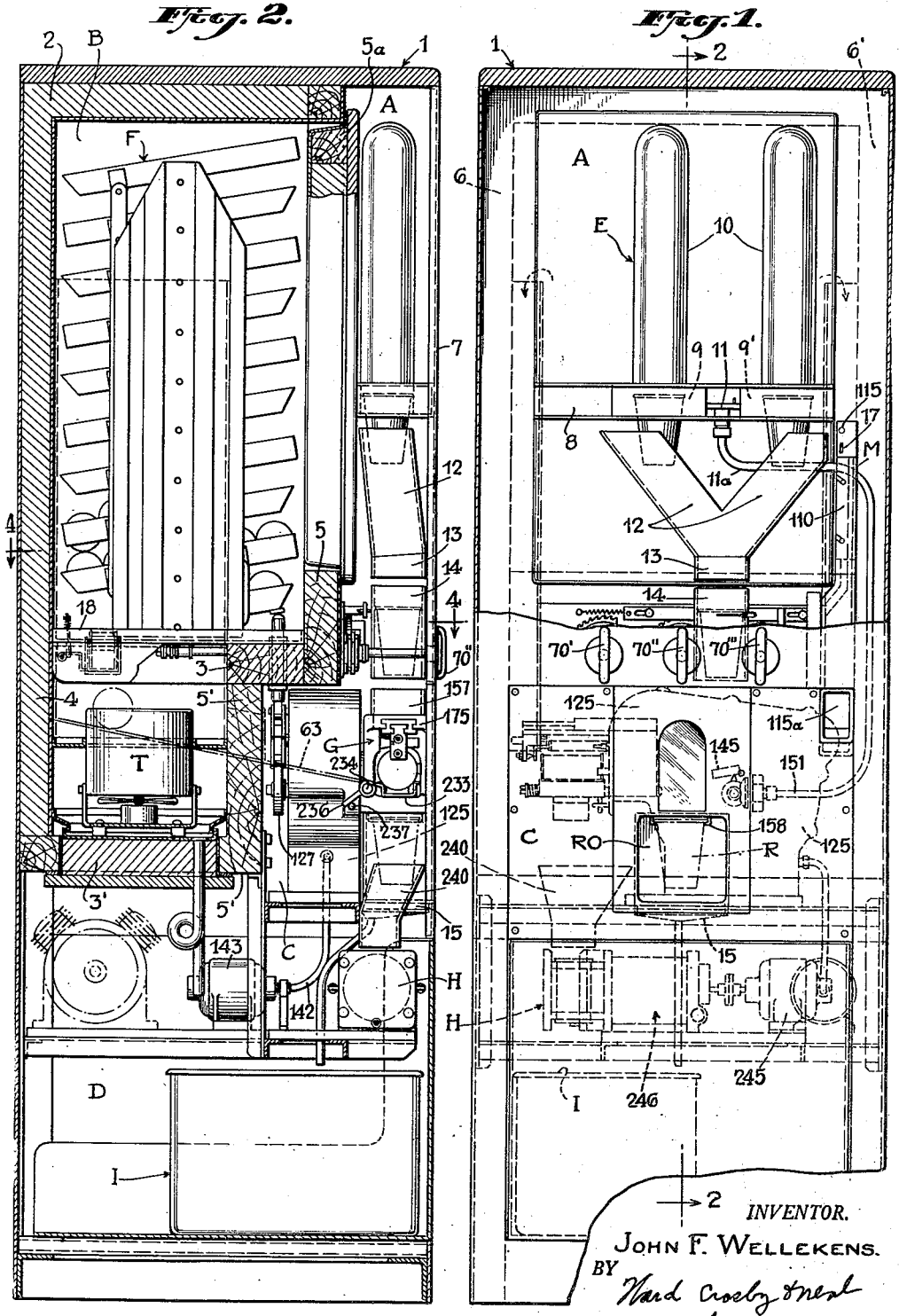

Oct. 2, 1956  J. F. WELLEKENS  2,765,005
APPARATUS FOR DISPENSING BEVERAGES
Filed July 19, 1951  19 Sheets-Sheet 3

INVENTOR.
JOHN F. WELLEKENS.
BY Ward Crosby & Neal
his ATTORNEYS.

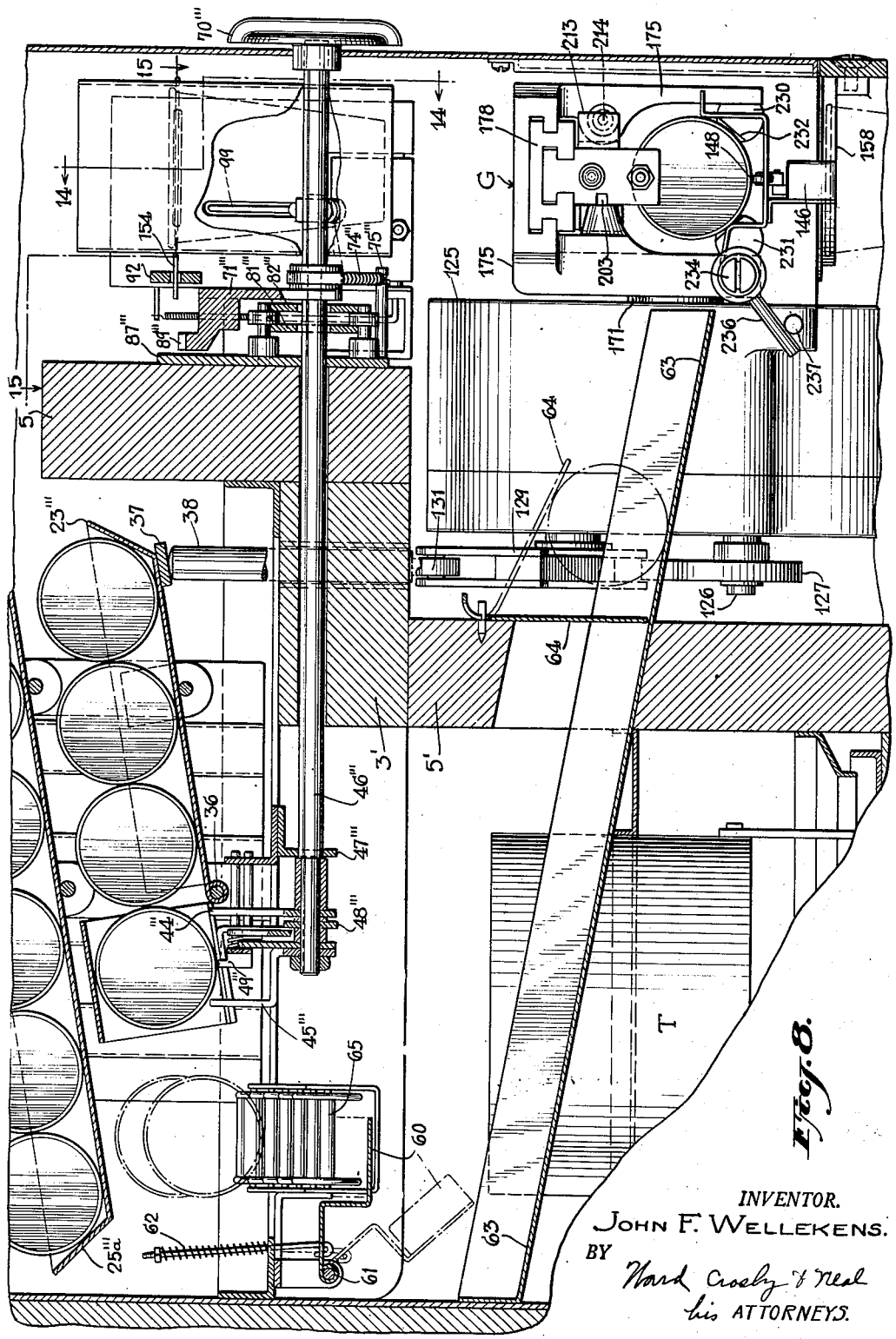

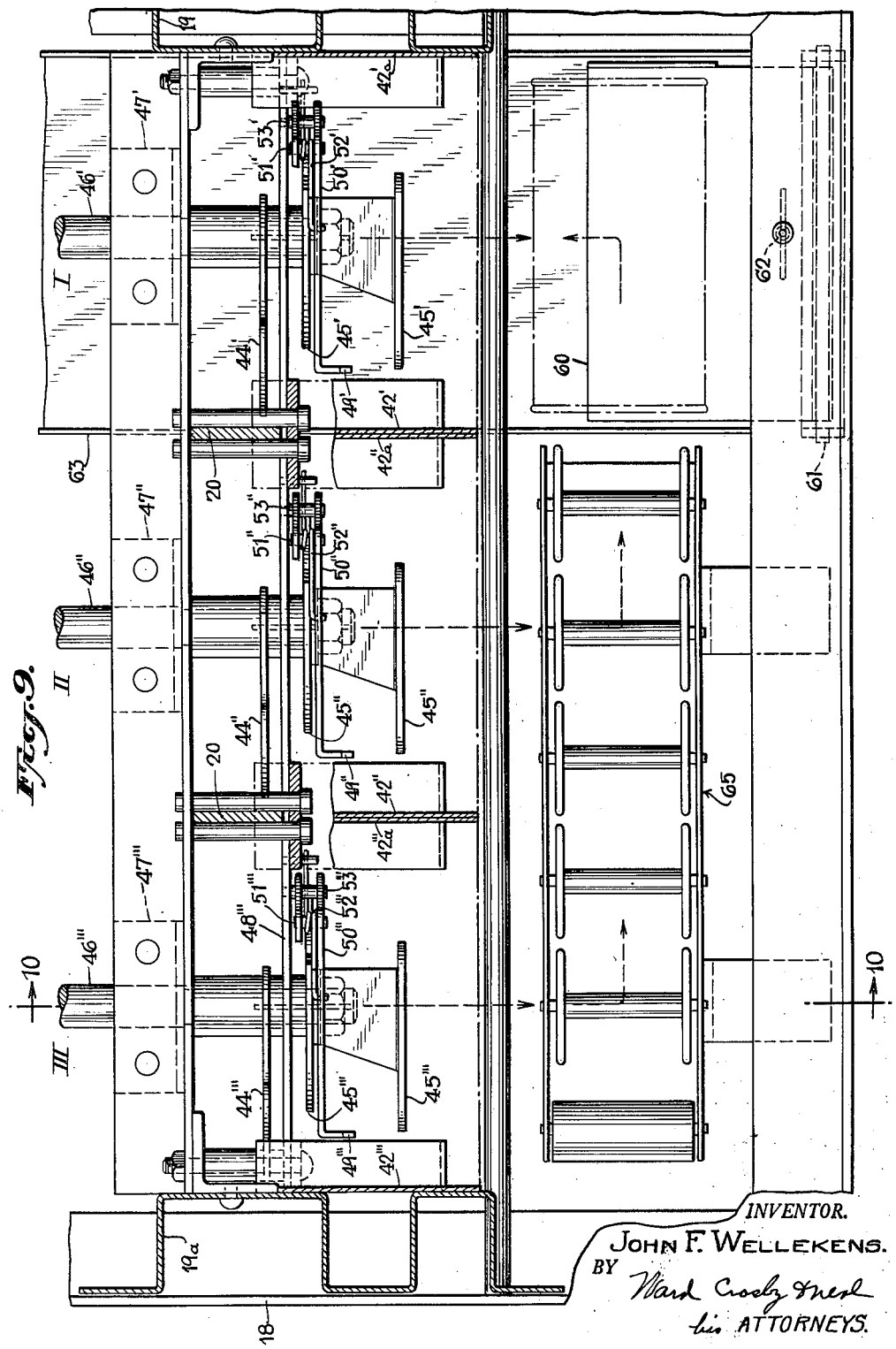

Oct. 2, 1956  J. F. WELLEKENS  2,765,005
APPARATUS FOR DISPENSING BEVERAGES
Filed July 19, 1951  19 Sheets-Sheet 6
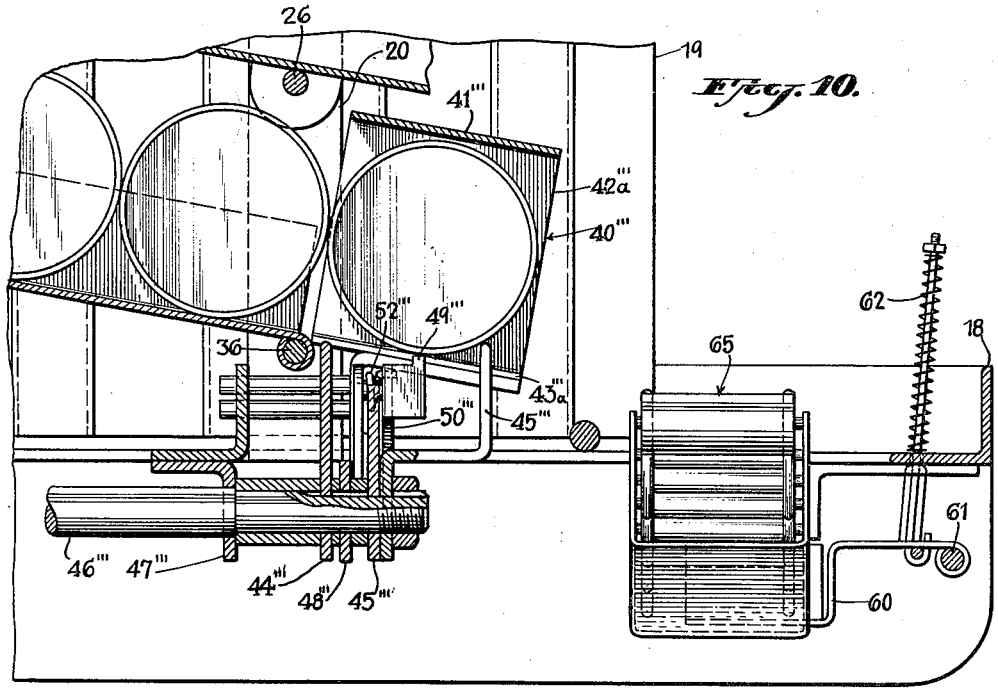
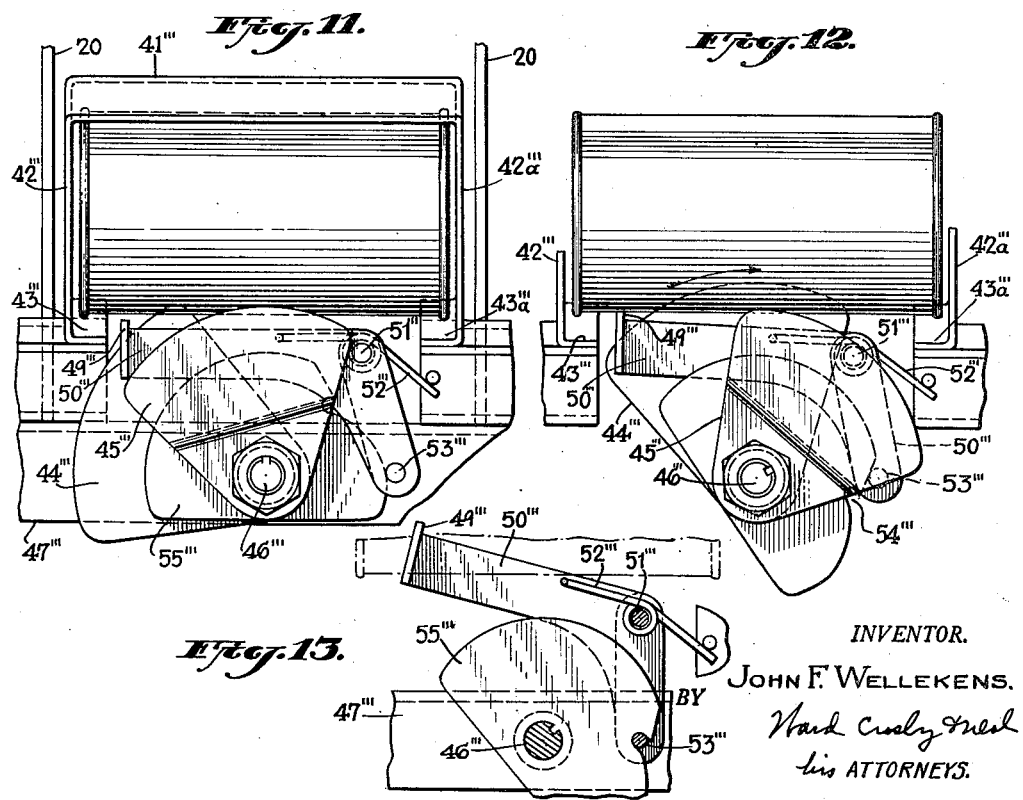
INVENTOR.
JOHN F. WELLEKENS.
BY
his ATTORNEYS.

Oct. 2, 1956 J. F. WELLEKENS 2,765,005
APPARATUS FOR DISPENSING BEVERAGES
Filed July 19, 1951 19 Sheets-Sheet 7
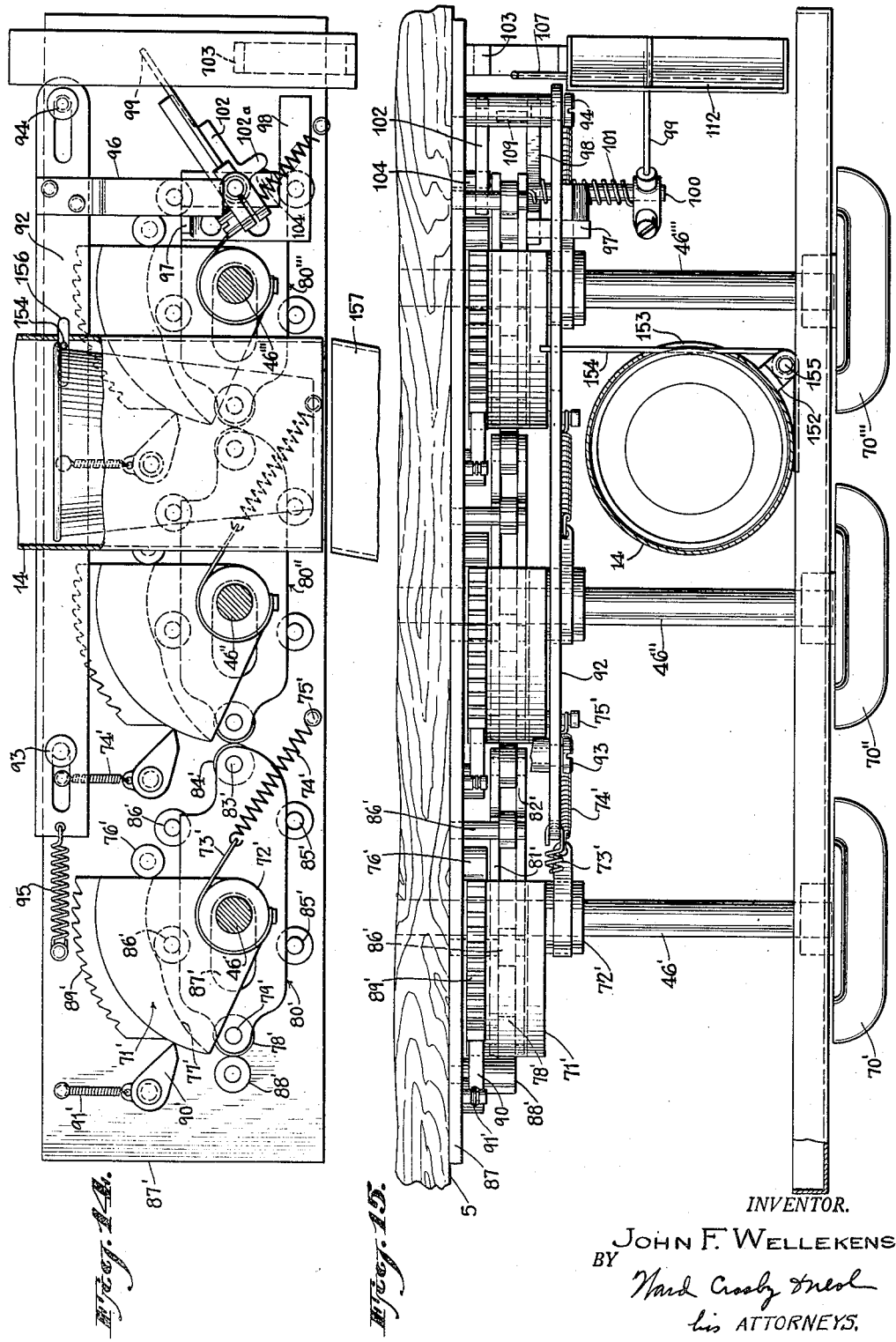
INVENTOR.
JOHN F. WELLEKENS.
BY
his ATTORNEYS.

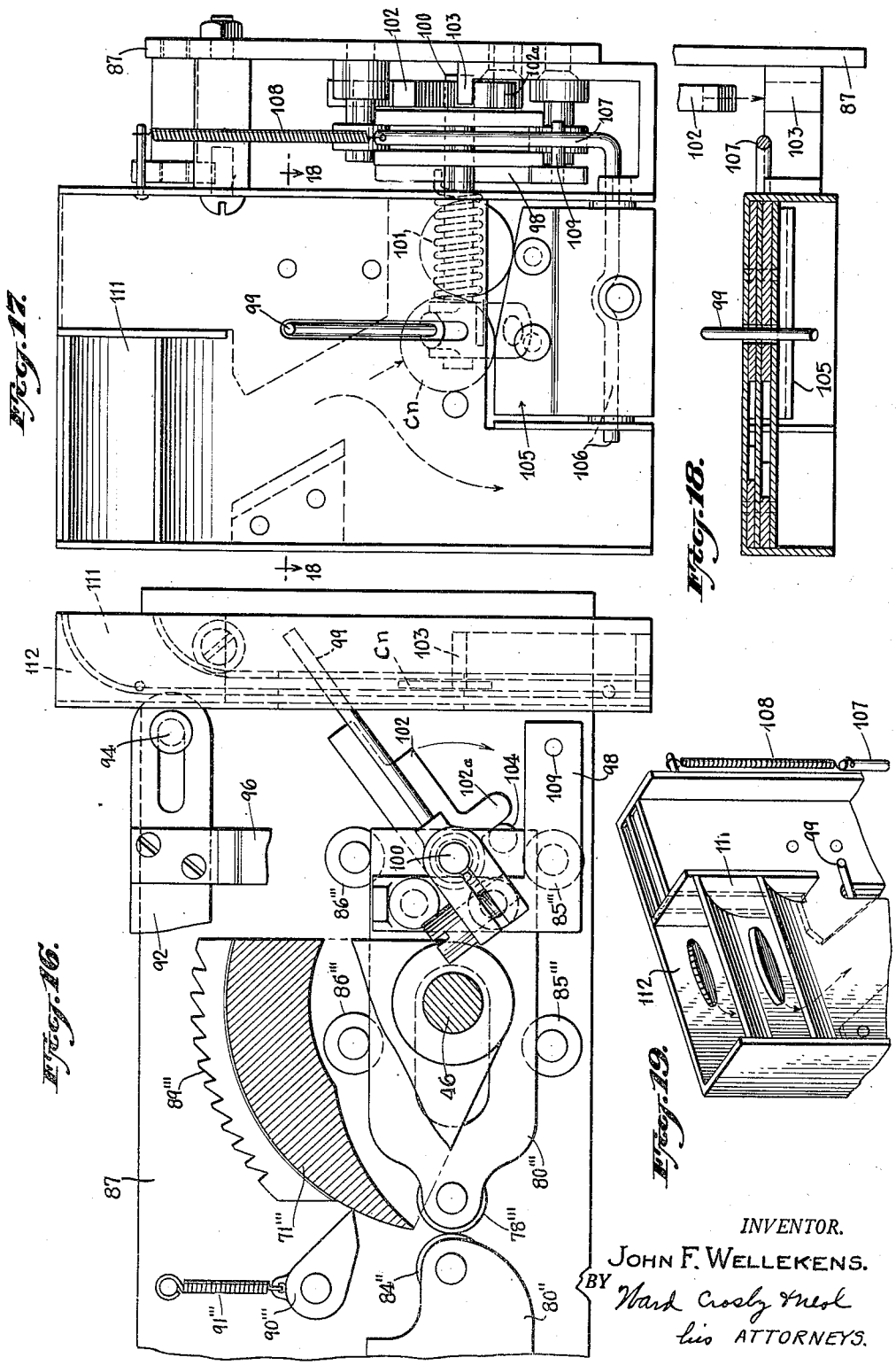

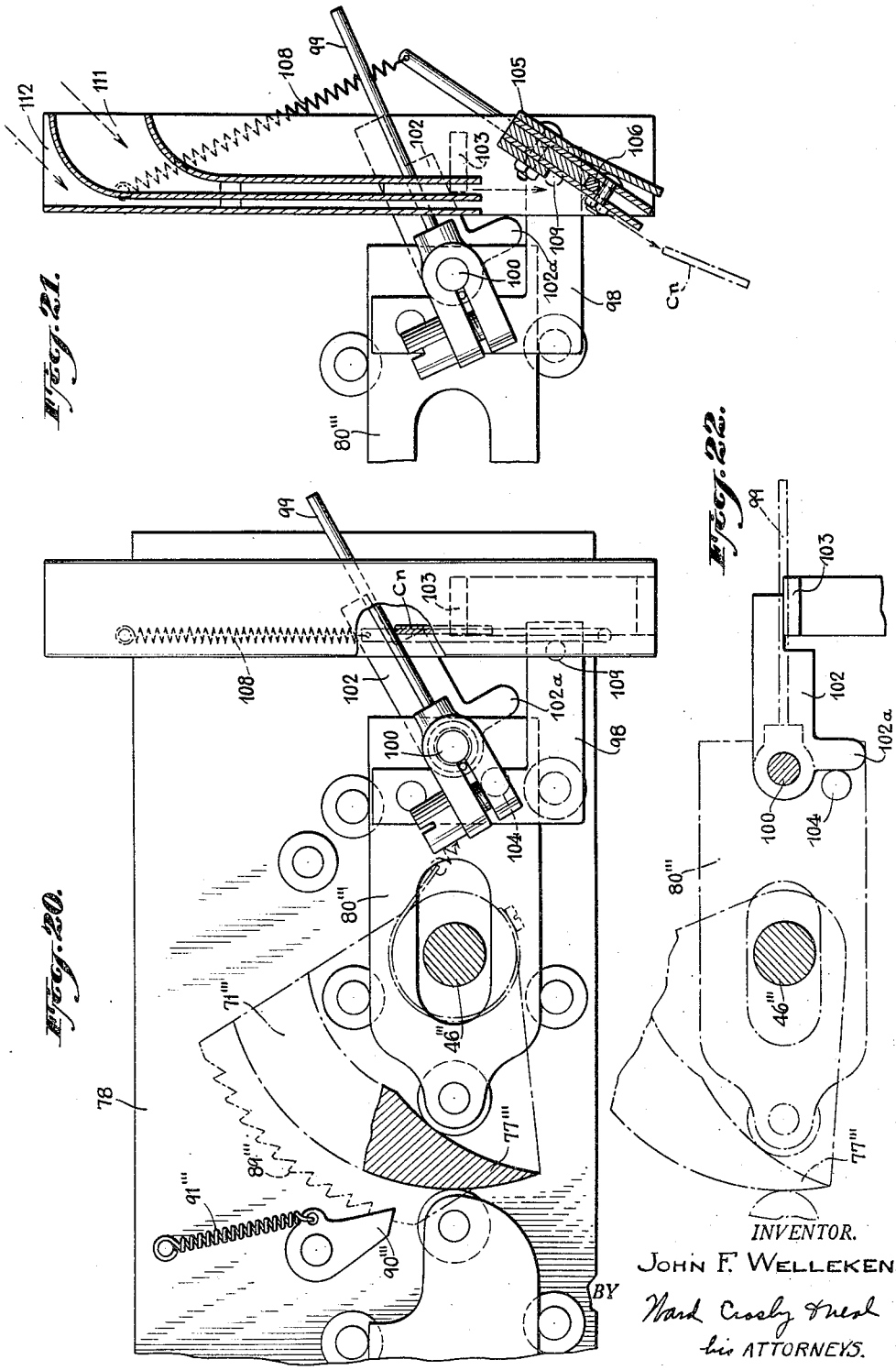

Oct. 2, 1956  J. F. WELLEKENS  2,765,005
APPARATUS FOR DISPENSING BEVERAGES
Filed July 19, 1951  19 Sheets-Sheet 10
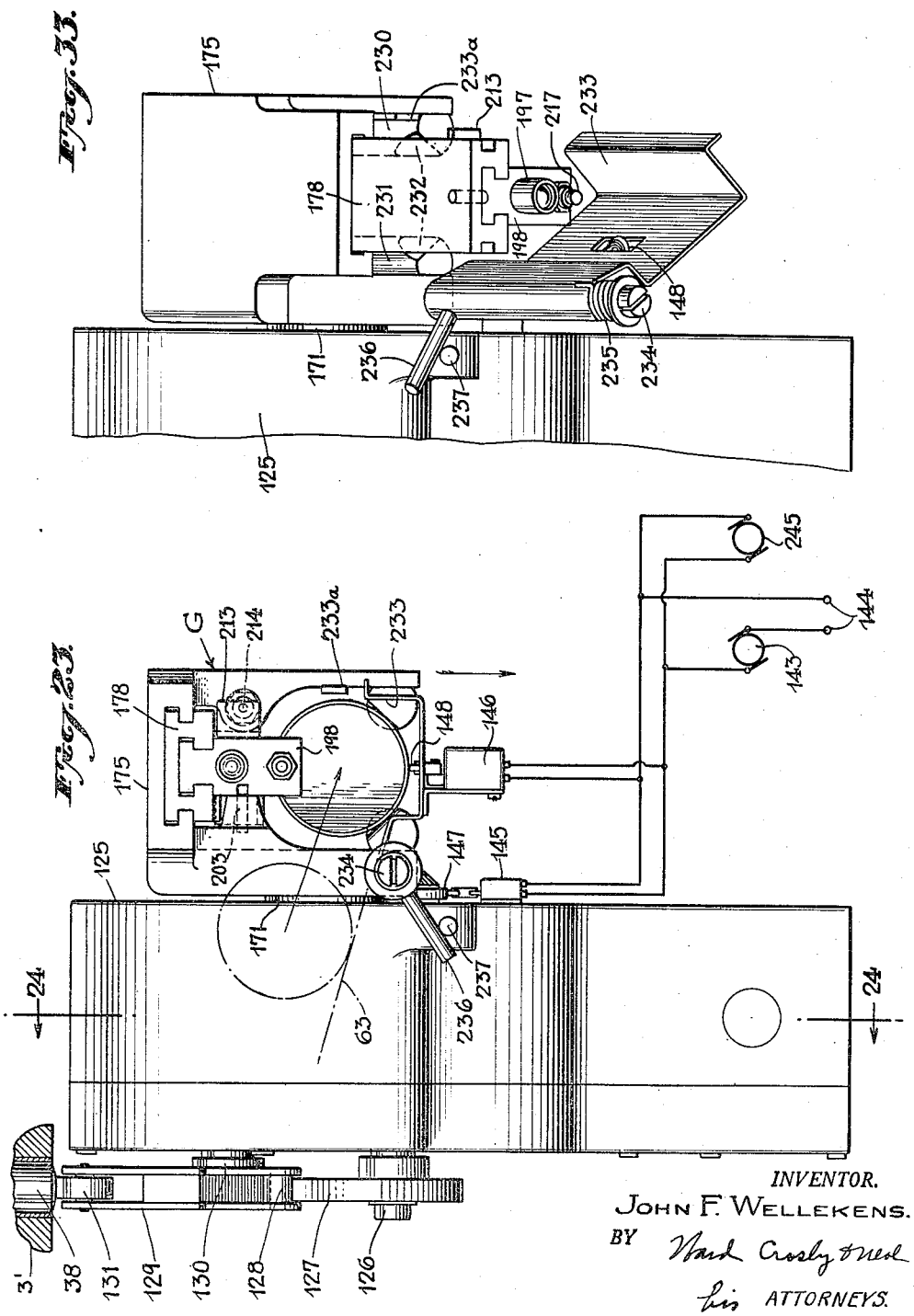
INVENTOR.
JOHN F. WELLEKENS.
BY
his ATTORNEYS.

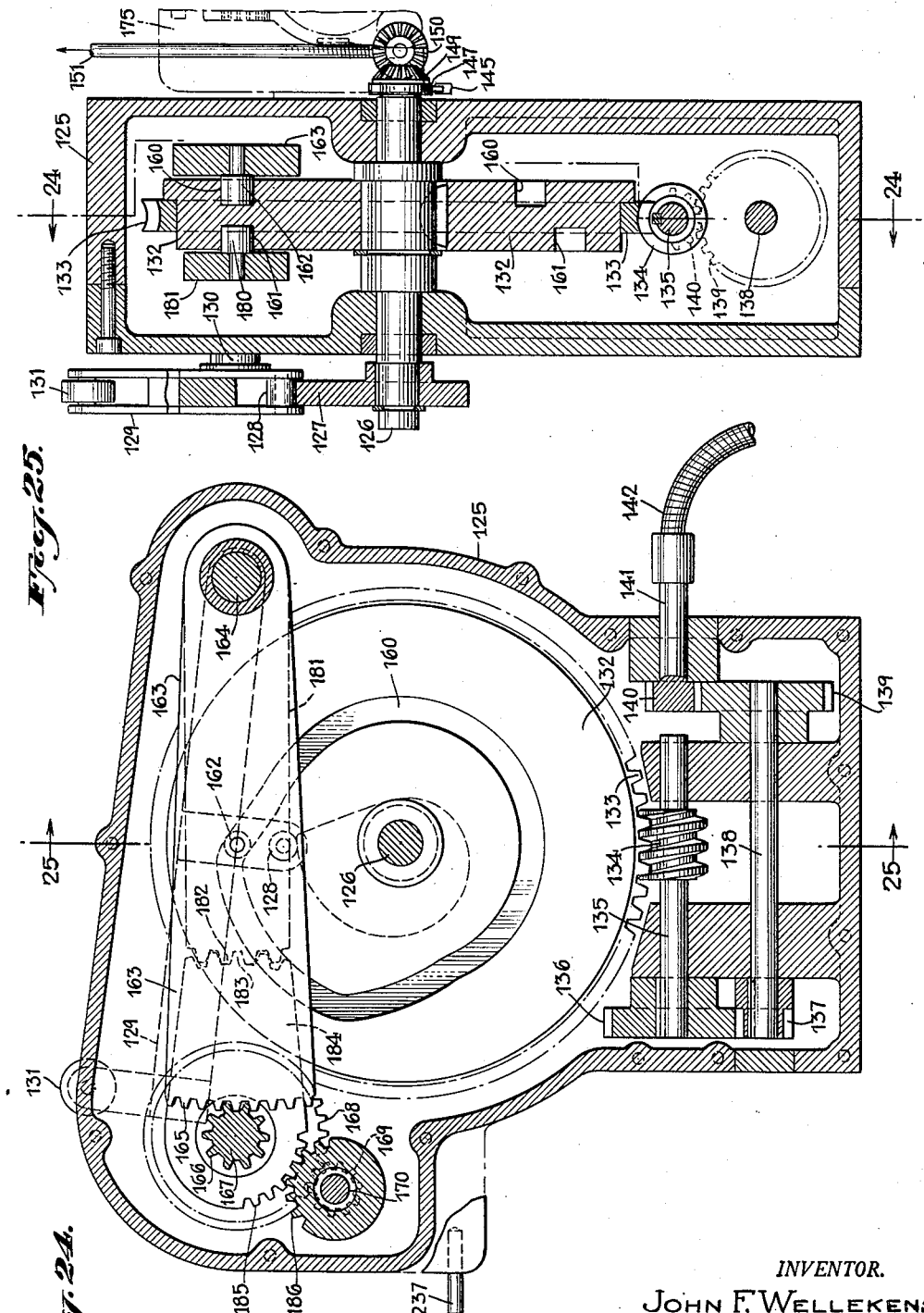

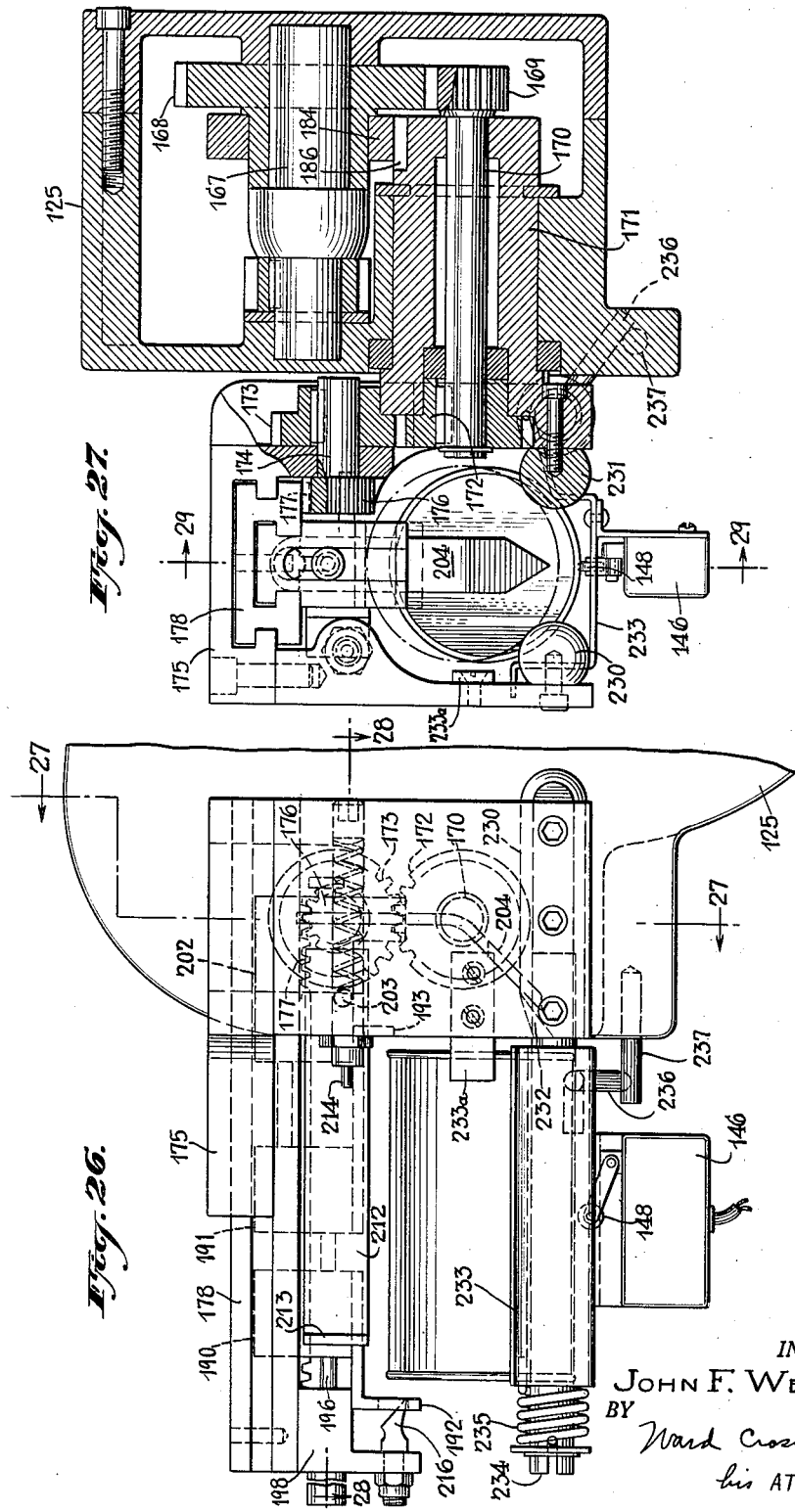

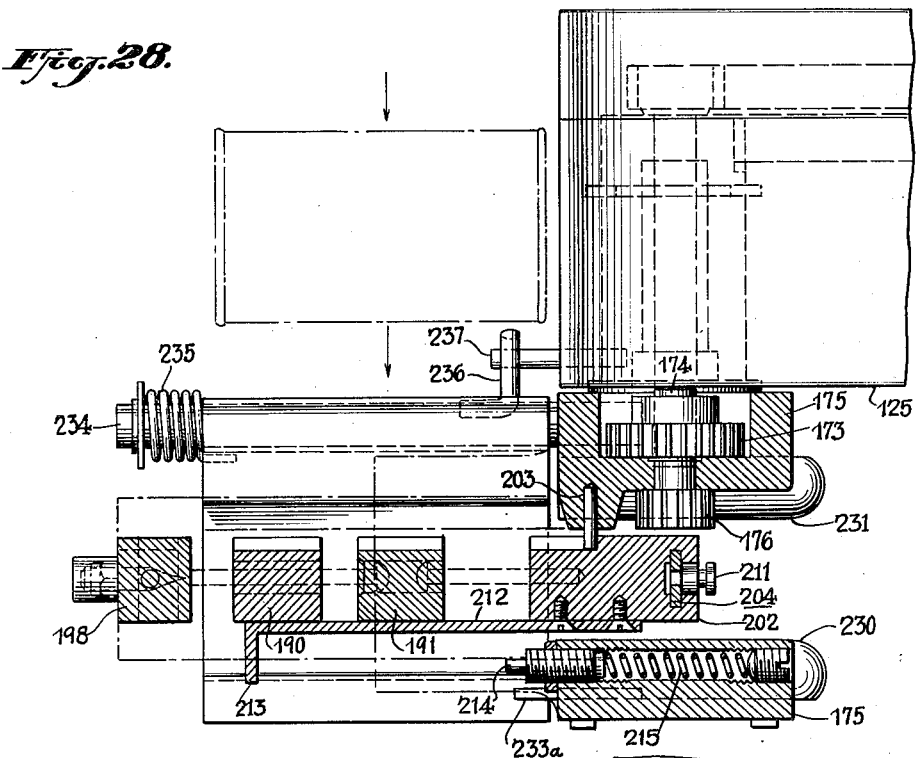

Oct. 2, 1956 J. F. WELLEKENS 2,765,005
APPARATUS FOR DISPENSING BEVERAGES
Filed July 19, 1951 19 Sheets-Sheet 14

INVENTOR.
JOHN F. WELLEKENS.
BY Ward Crosby Neal
his ATTORNEYS.

Oct. 2, 1956    J. F. WELLEKENS    2,765,005
APPARATUS FOR DISPENSING BEVERAGES
Filed July 19, 1951    19 Sheets-Sheet 15

INVENTOR.
JOHN F. WELLEKENS.
BY
ATTORNEYS.

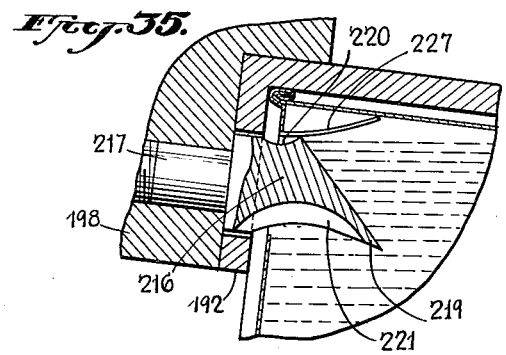
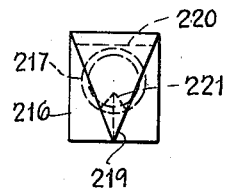
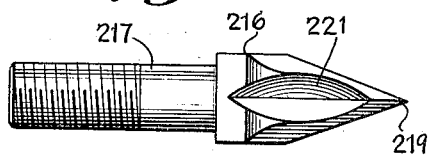
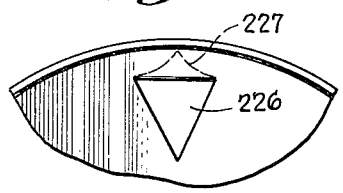
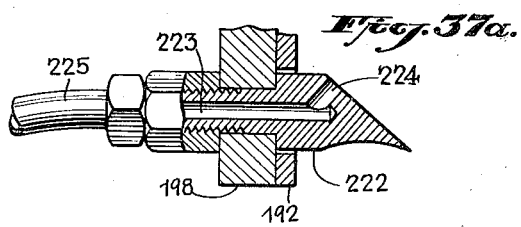
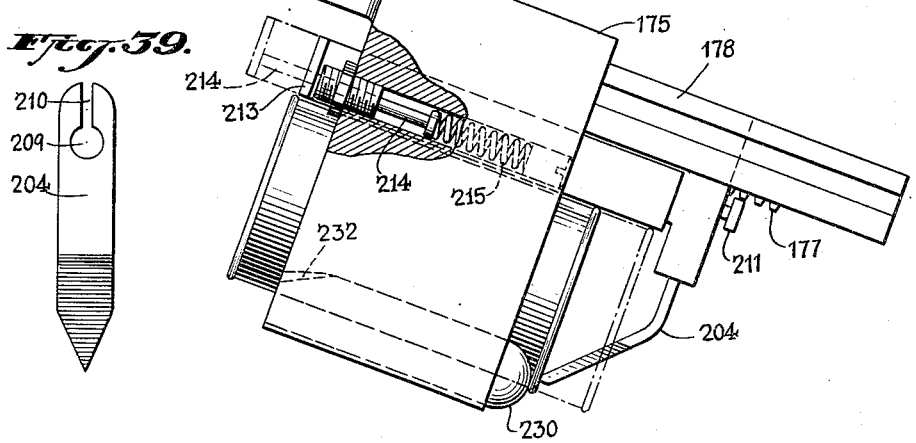

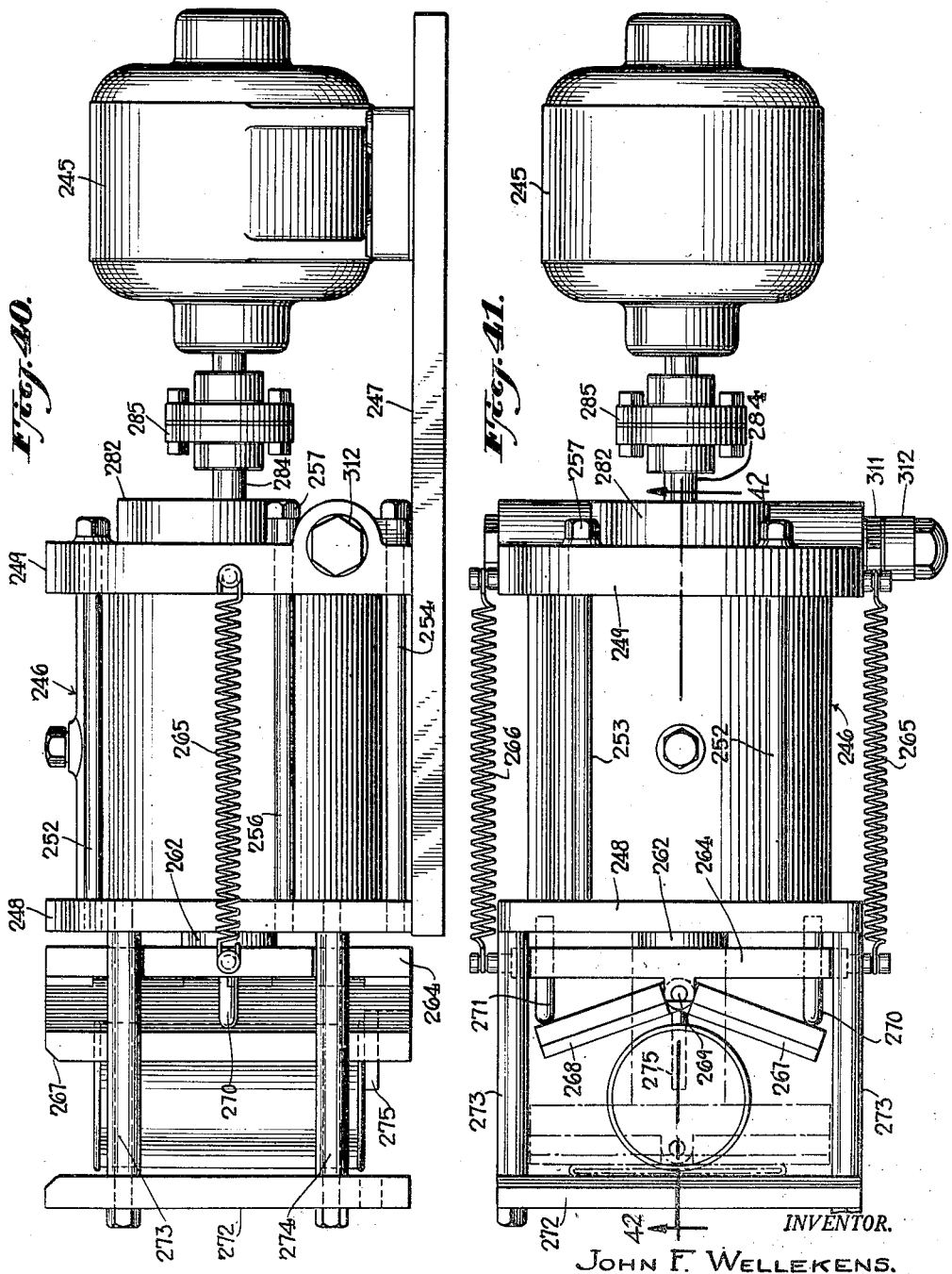

Oct. 2, 1956          J. F. WELLEKENS          2,765,005
APPARATUS FOR DISPENSING BEVERAGES
Filed July 19, 1951          19 Sheets-Sheet 18
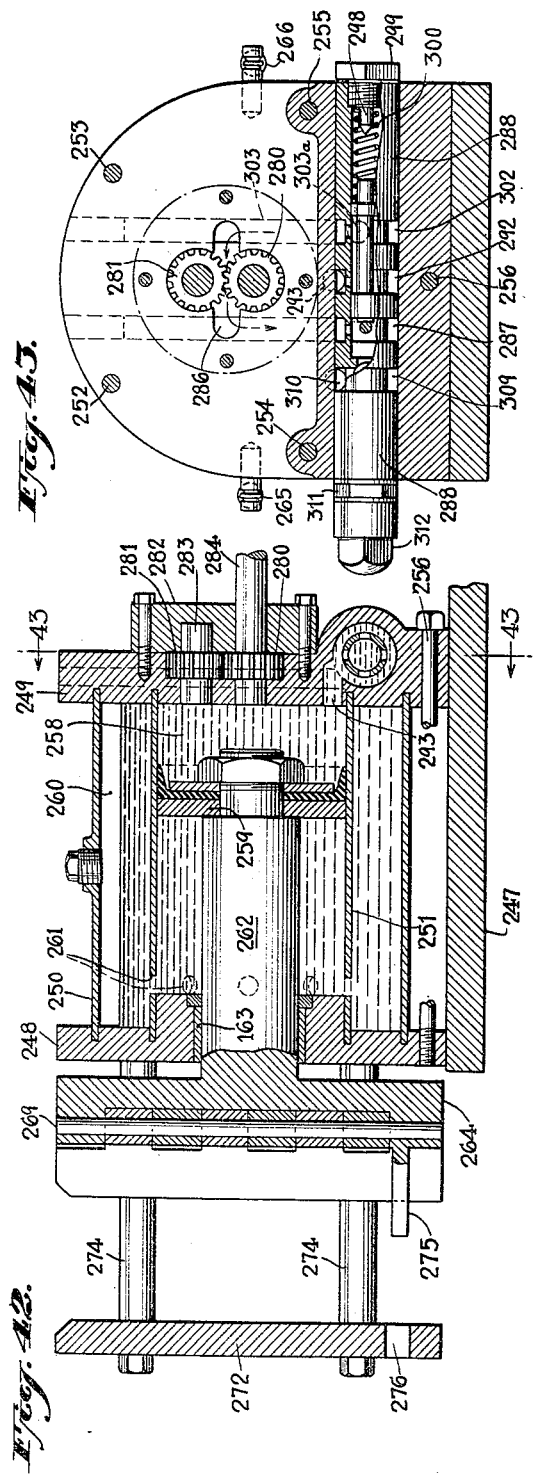
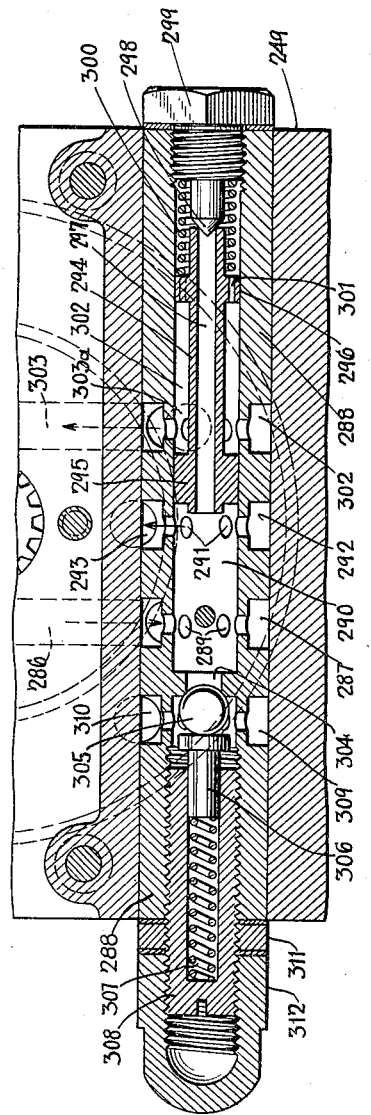
INVENTOR.
JOHN F. WELLEKENS
BY
Ward Crosby Mead
his ATTORNEYS.

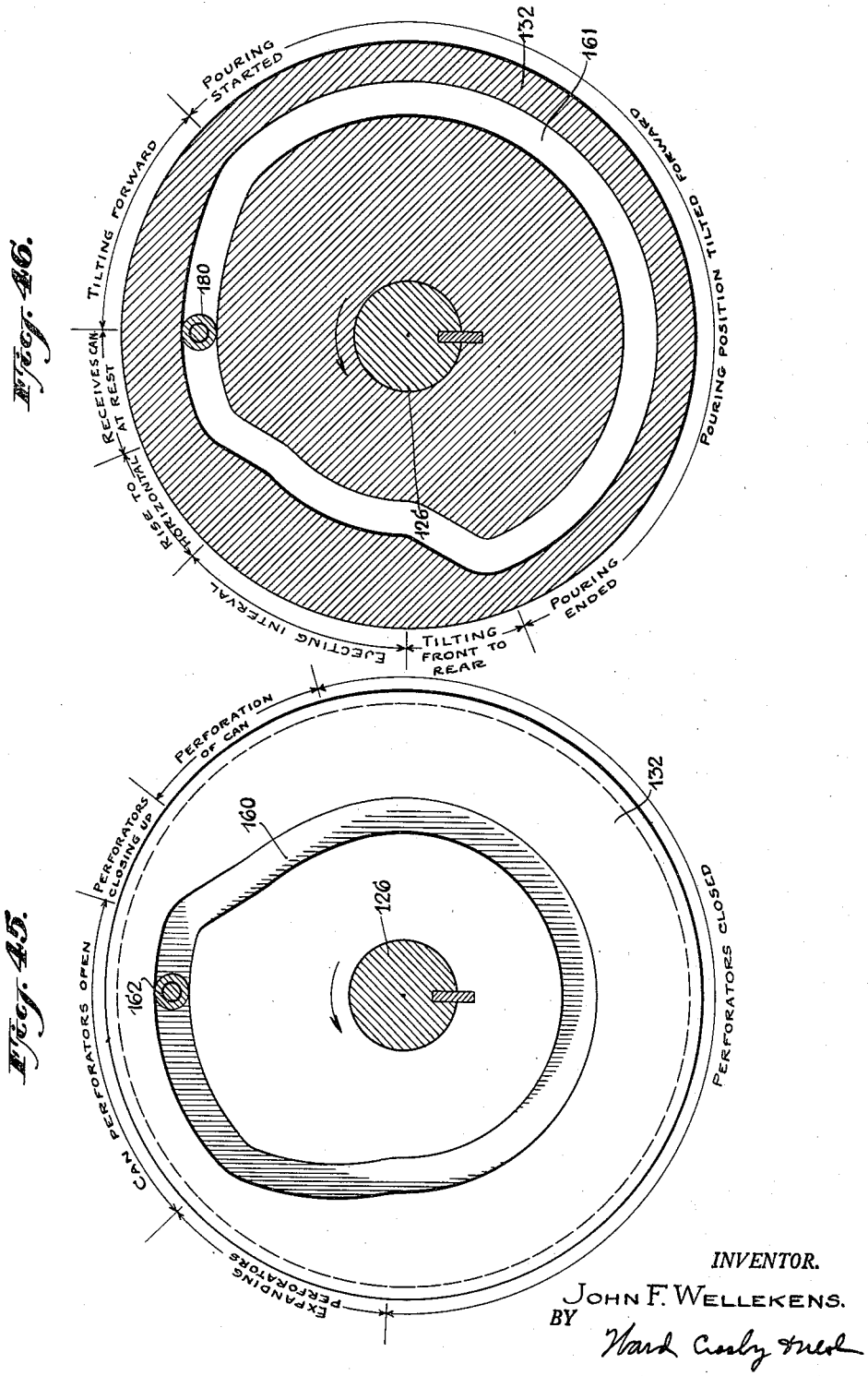

ommitted header: United States Patent Office — 2,765,005 — Patented Oct. 2, 1956

2,765,005
APPARATUS FOR DISPENSING BEVERAGES
John F. Wellekens, Staten Island, N. Y.

Application July 19, 1951, Serial No. 237,513

17 Claims. (Cl. 141—88)

This invention relates to apparatus for dispensing beverages or other edible fluids from cans or the like sealed containers made of metal or other suitable puncturable material, and is especially adapted for coin actuation and pre-selection of one of a plurality of flavors or kinds of beverages or the like edible fluids.

Conventional beverage dispensers presently in wide use fall into three general classes:

1. Those in which the ingredients (i. e. syrup and water) are stored in bulk and when dispensed are mixed in a cup.
2. Those in which the beverages are sealed in cans and the cans are dispensed and the beverage is consumed from the cans.
3. Those in which beverages are sealed in cans of relatively larger size (i. e. in bulk); the large cans being fed in register with a bulk reservoir tank into which the contents of the cans are successively emptied by opening successive cans as they reach the reservoir; and the beverage is dispensed from the storage tank or reservoir by means of a measuring valve.

In each of these types there are certain inherent disadvantages. In the first or bulk mix type the bulk containers for the syrup are opened to be filled and are therefore subject to contamination; and the water is usually supplied from the tap and hence depends upon the condition of the general water supply at the particular locality. In the second or canned beverage type the beverages tend to settle in such cans as remain in the storage space for an appreciable time and hence those flavors which do not move fast are often in an unpalatable state; the cans when delivered to the customer have to be opened by a separate manipulation; the contents are either drunk directly from the can or by means of a straw and the cans are carried away and hence their metallic constituent is not readily recoverable and is usually lost. In the third type or bulk-can type the open pouring from the bulk can to the storage reservoir or tank and the exposure of the beverage poured into the tank, due to the open top of the tank, subject the beverage to contamination. Additionally, this type has the inherent disadvantage of the measuring valve.

An object of the present invention is to provide a dispenser wherein all cans of liquid stored therein are agitated each time a can is removed.

Another object is to provide mechanism for opening a can automatically as a part of the cycle of operation of dispensing a drink from said can directly into a drinking receptacle.

Another object is to provide mechanism for opening and venting a can, pouring the contents into a cup (preferably a one-use paper cup automatically supplied) and preventing drip from the can.

Another object is to provide means for receiving empty cans and crushing them to a flat condition and discharging them into a suitable storage for removal and use as scrap metal.

Another object of the invention is to provide a machine of the character described in which a large quantity of cans of each of a plurality of flavors or kinds of drinks may be stored, a can of desired flavor selected, discharged, opened, poured into a receptacle, and the empty can crushed and discharged, all automatically and sequentially as part of a single cycle of operation.

Other objects are to provide a thermal chamber for the cans, adapted to maintain the contents at a predetermined warm or cool temperature; the chamber being free from electrical switches therein: the actuating mechanism in large part being disposed exteriorly of the thermal chamber; ready access into the chamber being provided for loading; the cup supply being exterior to said chamber for ready accessibility and visible to the customer; and the operating mechanism for effecting the over-all cycle of operations being "unitized" for ease of manufacture and assembly and ready maintenance.

Further objects, advantages and features of the invention will be apparent from the following detailed description of a presently preferred form of the invention taken in connection with the accompanying drawings hereinafter referred to and in which:

Fig. 1 is a front elevation showing a preferred form of the invention, with certain parts broken away;

Fig. 2 is a sectional view taken along the line 2—2 of Fig. 1 showing the general arrangement of the parts in side elevation;

Fig. 3 is a somewhat enlarged side elevational view of the supply magazine unit, as viewed from the left hand side of the machine;

Fig. 8 is an enlarged side elevational view, partly in section, of the lower end of the supply magazine and related dispensing and delivering mechanism associated therewith, taken from the left hand side of the device;

Fig. 9 is a plan view of the rear part of the mechanism shown in Fig. 8, illustrating further details of the dispensing and delivery mechanism associated with the supply magazine;

Fig. 10 is a cross-sectional view taken along the line 10—10 of Fig. 9;

Figs. 11 and 12 are rear elevational views showing certain parts of the gate control mechanism illustrated in Fig. 10 in two different positions of operation;

Fig. 13 is a view similar to Fig. 12 showing further details of locking mechanism actuated when no can is present to be disposed;

Fig. 14 is a sectional view taken along the line 14—14 of Fig. 8 showing certain of the actuating mechanism in front elevation;

Fig. 15 is a sectional view taken along the line 15—15 of Fig. 8 showing the parts of Fig. 14 in plan view;

Fig. 16 is an enlarged front elevational view of a part of the mechanism shown in Figs. 14 and 15 in conjunction with coin lock mechanism;

Fig. 17 is a side elevational view of the structure shown in Fig. 16;

Fig. 18 is a sectional view taken on line 18—18 of Fig. 17;

Fig. 19 is a perspective view showing further details of certain parts shown in Figs. 16 and 17;

Figs. 20, 21 and 22 are side elevational views of certain of the parts shown in Figs. 16 and 17 with the parts shown in different positions of operation;

Fig. 23 is a side elevational view showing the main drive gear box, can opening and pouring unit and somewhat diagrammatically illustrating the electrical circuit connections for the main drive motor and can crushing motor;

Fig. 24 is a sectional view along the line 24—24 of Fig. 23 showing certain details of the drive gear arrangement;

Fig. 25 is a sectional view taken on the line 25—25 of Fig. 24;

Fig. 26 is a front elevational view of the can opening and pouring unit;

Fig. 27 is a side elevational view, taken from the left hand of the device, showing the can opening and pouring unit and sectional view of the main drive associated therewith;

Fig. 28 is a sectional view taken along the line 28—28 of Fig. 26, showing the mechanism in sectional plan view;

Fig. 29 is a sectional view taken on line 29—29 of Fig. 27 showing the parts in sectional front elevation;

Fig. 33 is a rear elevational view showing further operational details of the mechanism for discharging an empty can from the opening and pouring unit;

Figs. 34–39 illustrate further details of certain of the can opening and pouring elements;

Fig. 40 is a side elevational view of the can crushing unit with the crushing jaws in open position to receive an empty can;

Fig. 41 is a plan view of the crushing unit shown in Fig. 40;

Fig. 42 is a longitudinal sectional view taken on the line 42—42 of Fig. 41;

Fig. 43 is a transverse sectional view taken along the line 43—43 of Fig. 42;

Figure 4:
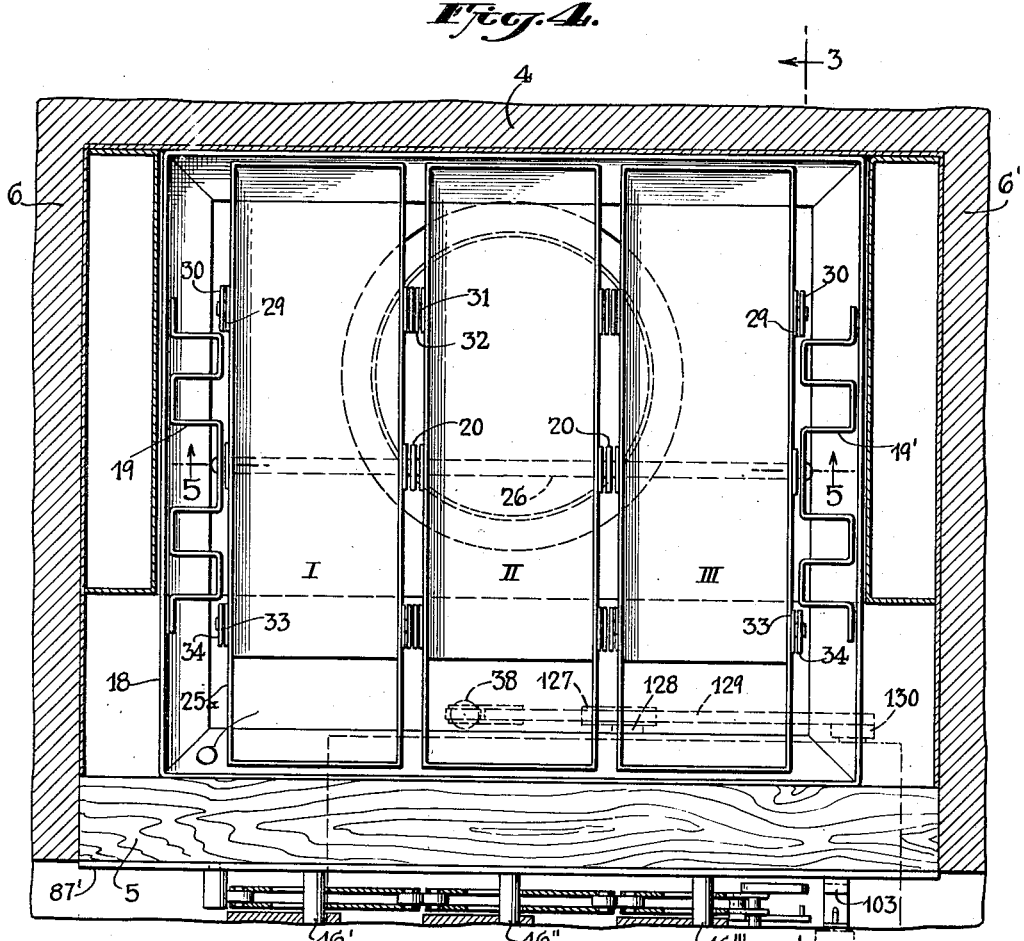
Fig. 4 is a cross-sectional view taken substantially along the line 4—4 of Fig. 2 so as to show certain structure in plan view.

Fig. 44 is a somewhat enlarged transverse sectional view also taken along the line 43—43 of Fig. 42 and showing further details of the fluid valve arrangement; and Figs. 45 and 46 are timing diagrams of the main drive cam shown in Fig. 25, both as viewed from the front; Fig. 45 showing the cam track for actuating the rack and associated mechanism of the opening and pouring unit and Fig. 46 showing the cam track for locking the cam opening and pouring mechanism.

In general the invention contemplates a fully automatic unit which comprises component units arranged and cooperatively interrelated for effecting an operational cycle. It is to be understood, however, that certain novel units and features of the invention may be usefully employed in other arrangements or assemblies. In its present preferred form the invention is adapted to hold a supply of canned liquids of several species, in a thermally insulated chamber for maintaining the liquids at the desired temperature (cooled for cold beverages, such as fruit juices or soft drinks, or warm for hot liquids, such as soups). Provision is made for releasing the operating mechanism upon deposit of a required coin upon the receipt of which the purchaser may select the desired specie of liquid. Thereafter the entire operation is automatic and follows the cycle now to be described.

The can of a selected species is discharged from the supply magazine and transferred out of the insulated chamber through a swinging door and into a can opening and pouring unit where the can is punched to provide a pour opening and a vent opening, the can is moved into position over a cup which has been delivered into receiving position, and the can is then inclined to cause the liquid to pour into the cup. After the contents has been poured into the cup the can is immediately inclined in the opposite direction to prevent any drip from its pouring end, the can is moved out of registered alignment with the cup and is discharged to the crushing unit.

Suitable controls are provided to lock the mechanism until a suitable coin is accepted, or in the event that no can of the selected species is in the magazine, and for controlling the desired sequence of operations and determining the complete cycle of operation.

GENERAL ARRANGEMENT

A supporting cabinet or housing 1 (Figs. 1 and 2) provides a front compartment A, a thermally insulated chamber B; a beverage delivery compartment C, and a bottom compartment D, suitable cup dispensing mechanism, designated in general as E, is disposed in the front compartment A; supply magazine mechanism, designated in general as F, is disposed within the thermally insulated chamber B; a can opening and pouring unit, designated in general as G, is disposed within the beverage delivery compartment C; an empty can-crushing unit, designated in general as H, is disposed within the bottom compartment D in such position beneath the can pouring unit G as to receive empty cans discharged therefrom; a suitable bin or drawer I is likewise disposed within the bottom compartment D beneath the crushing unit H for receiving and collecting crushed cans; an opening RO is provided in the beverage delivery compartment C for ready access to a cup or drinking receptacle R delivered thereto from the dispensing unit E; and suitable thermal conditioning means, generally designated as T, is provided for maintaining the compartment B at the desired temperature, which may be below normal temperature for cool beverages such as soft drinks or beer, or above normal for hot foods such as soups, etc.; it being understood that suitable circulation ducts are provided. Suitable coin selective means is provided for controlling the operation of the apparatus and is indicated in general as M.

The compartment B is defined by a top wall 2, bottom wall panels 3—3', a rear wall 4, front wall panels 5—5' and side walls (Fig. 4) 6 and 6'. The front panel 5 is provided with a door 5a to provide ready access for loading the magazine F and the front wall of the cabinet 1 is provided with a glass or other suitable transparent panel 7 for visual inspection of the supply of cups in the dispenser unit E, and this panel is readily removable or openable for access to compartments A and B. The cup dispensing mechanism E is conveniently supported on the door 5a by means of a bracket 8, so that upon opening the door the cup dispensing mechanism will be similarly moved for free access to the chamber B.

OPERATION IN GENERAL

With the magazine F loaded with a supply of filled and sealed cans and the dispensing unit E being loaded with a suitable supply of cups, the customer conditions the apparatus for the operational cycle by depositing the required coin, and then manually operates a control handle corresponding to the particular flavor or kind of drink selected from those available. Provision is made for first checking for presence of can of selected beverage, then for the proper coin. If no can is present coin is refused and further operation is inhibited and if proper coin is not received operation is likewise inhibited. If can is present and proper coin is deposited the control handle may be moved through its full stroke and the following steps in the complete cycle ensue. The cup dispenser delivers a cup in position to receive the liquid. The selected can is discharged from the magazine F and conveyed from the compartment B to the opening and pouring unit G which pierces one end with a pouring opening, supplies a suitable vent opening, tips the can and empties the contents into a cup R, tips the can in the reverse direction to prevent drip, and discharges the empty can to the crushing unit, and returns to its can receiving position. During the time that the opening and pouring unit G is operating the crusher unit H is operating to crush and discharge to the bin D the preceding empty can and returns to its initial position in time to receive the next empty can. Mechanism is provided for suitable movement of the filled cans in the magazine F to agitate their contents during each cycle of operation. Suitable control switches are provided to insure proper sequential operation of certain of the units in timed relation.

Cup dispensing mechanism

The cup dispensing mechanism preferably comprises two conventional dispensing units 9—9' suitably secured to the bracket 8 and provided with the usual glass covers 10 to protect the nested stacks of cups. The dispensing units are alternately operated by a suitable gear or cam 11 driven by a flexible shaft 11a in timed relation to the remaining parts; the flexible shaft 11a permitting limited movement of the mechanism as previously mentioned. A Y-shaped chute 12 is supported from the bracket 8, for receiving cups alternately dispensed from the respective units 9—9', and terminates in a discharge throat 13 in register with a tube 14 (Fig. 2) whose upper end is spaced below the throat 13 (to provide for a cup arresting finger to be later described) and its lower end is disposed over a splash collector 15 for conveying any spilled fluid to the bin or drawer I.

Supply magazine

Referring more particularly to Figs. 2, 3, and 4: the magazine unit has a main supporting frame comprising a base 18, resting on and secured to the bottom panel 3 of chamber B, laterally spaced upright side members 19—19' which are secured to the base 18 and preferably are channeled for stiffening purposes and to provide circulation ducts, and intermediate vertical members such as 20, also secured to the base 18. A series of vertical stacks I, II and III each comprising a top tray such as 22, a bottom tray such as 23, intermediate trays such as 24 and alternate trays such as 25 and 25a arranged and supported in the manner now to be more specifically described. The lowermost of the alternate trays being designated 25a to indicate a difference to be hereinafter referred to.

Figure 5:
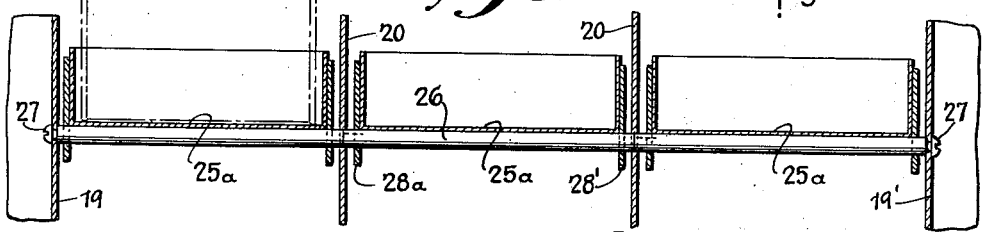
Fig. 5 is a sectional view taken along the line 5—5 of Fig. 4 showing certain details of the pivotal arrangement of trays forming a part of the supply magazine.

The respectively corresponding trays of the several series are arranged in tiers, i. e., in lateral alignment and are supported for rocking movement about a transverse axis disposed intermediate their front and rear ends, such as by being pivotally supported on cross bars such as 26 whose opposite ends are secured to the side frame members 19—19' as by screws 27. Preferably the trays are each mounted on their supporting rods 26 by means of a pair of pivot lugs secured, as by welding, to the opposite sides of the trays. The lugs on trays 22 and the alternate trays such as 25 and 25' (Figs. 4–6) are designated 28 and are provided with holes through which the rods 26 pass; while the lugs 28a (Figs. 3, 7) on the intermediate trays (Figs. 5, 6) such as 24, are provided with slots in which the rods 26 are received to permit limited movement of those trays upwardly from their rods to facilitate loading, as will be more fully explained hereinafter. Between the pivot lugs, such as 28 or 28a and their rear ends the trays 22, 24, 25a and 25 of the three series I, II, and III carry operating lugs such as 29 rigidly secured thereto as by welding. The lugs 29 on the outer sides of said trays of series I and III (Figs. 4 and 3) are pivotally connected to a pair of outer operating links such as 30 while the lugs 29 on the inner sides of the trays of series I and III and the respectively contiguous lugs of the trays of series II are separately pivoted together by pins such as 31, passing through intermediate operating links such as 32. Each of the trays 25a of each of the series I, II and III are provided intermediate their pivotal lugs 28 and their forward ends, with a pair of lugs such as 33 rigidly secured to the sides thereof (Figs. 3 and 4). The lugs such as 33 are pivotally connected respectively to the upper ends of short operating links such as 34 whose lower ends are pivotally connected to lugs such as 35 rigidly secured to the lowermost trays 23 of the three series I, II and III. The trays 23 are supported for rocking movement about a common pivotal axle 36 in alignment with the axes 26 of the other trays (Figs. 3 and 8). It will thus be seen that upon rocking movement of the lowermost trays 23 about their axis 36 this movement will be transmitted through the operating link 34 and 30 to effect a corresponding and simultaneous movement of the remaining trays of the three stacks about their respective pivotal axes.

The lower trays 23 are provided with a striking plate 37 (Figs. 3 and 8) which is fastened across the bottoms of these trays and is abuttingly engaged by a vertical plunger 38 actuated from the driving mechanism in the manner to be described. When the plunger 38 is raised the trays are rocked about their axes in a clockwise direction to the position shown in Fig. 3 where they are inclined rearwardly and downwardly from the horizontal; and when the plunger is lowered the trays are returned in the opposite direction by a spring 39 and at their opposite position are inclined forwardly and downwardly from the horizontal.

It will be noted (Figs. 3, 4, 6 and 7) that the alternate trays 22, 25 and 25a have front end walls at substantially right angles to their bottoms and immediately adjacent said ends the bottoms are provided with discharge openings 0 slightly larger than a can to be dispensed; while the opposite or rear ends of intermediate trays such as 24 are similarly arranged. The end wall of the top tray 22 is preferably of reduced height (Figs. 3 and 6) to facilitate loading. The rear ends of the alternate trays 22, 25 and 25a and the front ends of the intermediate trays such as 24 are preferably inclined or beveled inwardly and downwardly to facilitate loading and discharge. From this it will be seen that when a can is dispensed from the lowermost tray of a stack the supply in the upper trays will be caused to progressively cascade from an upper to a successively lower tray upon the successive rocking of the trays in alternately opposite angles of inclination.

The rear ends of the bottom trays 23 (Figs. 3 and 8) terminate at about the pivot point 36, and these trays have no rear end walls to provide a free rear end delivery opening or for each tray of this tier. Thus each stack is provided with its respective delivery opening or outlet. In order to more accurately and positively control the delivery of cans from said delivery outlets there is provided at each a sleeve 40 (Figs. 3–4) having a top wall (Figs. 10, 11) 41, side walls 42, 42a turned inwardly at their lower ends to provide bottom shelves 43, 43a, whereby the cans are guided in a predetermined position for delivery.

Can delivery mechanism

Certain of the mechanism now to be described comprises three sets of parts each associated with a corresponding stack and to avoid repetition and avoid confusion respectively corresponding parts will be identified by the same reference characters with the added suffixes prime ('), second ('') and third (''') to designate association with the respective stacks I, II and III. Disposed at the delivery opening of each stack for operative movement alternatively into and out of the sleeve 40''' (Figs. 8, 9 and 10) are a pair of delivery gates comprising a rear gate such as 44''' and a front gate such as 45'''. These gates are in the form of sectors fixed on a manually operable shaft such as 46''' and rotatable thereby and therewith about the horizontal shaft axis, the shaft being suitably journaled at its rear end in a bracket such as 47''' and cross strip such as 48''' and at its forward end in the front panel 5 (Fig. 8). The gates 44''' and 45''' are spaced apart axially of the shaft 46''' and are so shaped and angularly set (Figs. 11 and 12) that upon rotation of the shaft 46''' in a counter-clockwise direction (as viewed from the front, Figs. 14 and 15, or clockwise as viewed from the rear, Figs. 11 and 12) the front gate 44''' moves upwardly into the path of a can while the rear gate 45''' moves downwardly out of the path of the can (Fig. 1), permitting a can to pass outwardly over the gate 45''' while blocking the next succeeding can by the gate 44''' and then upon the shaft being returned to its initial position the front gate 44''' is lowered to permit the next succeeding can to pass down the inclined bottom of tray 23''' as the rear gate 45''' is raised to prevent the can passing out of the sleeve 41'''.

In order to insure that the shaft 46''' may not be actuated for delivery unless a can is in position in sleeve 41''' for delivery a feeler finger such as 49''' (Figs. 8, 13) is disposed intermediate gates 44''' and 45''' in the path of can movement and is carried on the upper end of an arm 50''' pivotally mounted for movement about a pin 51'''. The arm 50''' is biased by a spring 52''' which urges the finger upwardly to a locking position, when no can is in position at the delivery outlet (Fig. 13) and is of such resiliency that the weight of a can moves the arm to an unlocking position (Figs. 11, 12). The lower end of the arm 50''' carries a locking pin 53''' positioned for engagement in a slot 54''' provided in a lock cam 55''' fixed on shaft 46''' for rotation therewith. When the finger 49''' is not engaged by a can it is raised by spring 52''' and the locking pin 53''' moves into slot 54''' (Fig. 13) as cam 55''' is rotated; thus locking the shaft and related delivery mechanism. Conversely, when a can is in position (Figs. 10–12) the pin 53''' is held from engagement in the slot 54''' and between the discharge of a can and the replacement by the next succeeding can the pin 54''' rides on the surface of cam 55''' (Figs. 11–12).

It will be understood that the stacks I and II are provided with identical delivery mechanism as that just described, which is associated with stack III. The three shafts, such as 46', 46'' and 46''', are each provided with suitable coin lock controls and related mechanism to be later described.

*Can transfer mechanism*

As the cans are released from the delivery openings of one or the other of stacks I, II or III they move rearwardly by gravity. Immediately to the rear and below the outlet of stack I (Figs. 8 and 9) is a transfer tray 60 in alignment for receiving a can as it rolls from sleeve 41 of stack I. The transfer tray 60 is pivotally mounted on a transversely extending axis 61 and is urged upwardly to the solid line horizontal position (Fig. 8) by a helical tension spring 62 of such resiliency as to be distended by the weight of a can falling into said tray, to thereby move tray 60 to the dotted line position. Disposed in alignment with tray 60 for receiving a can therefrom is the rear end of a forwardly and downwardly inclined delivery chute 63 which is below and substantially in alignment with stack I. The chute 63 passes through an opening in the insulated wall panel 5' and terminates adjacent the can opening and pouring unit G. A swinging door flap 64 is provided for normally closing the chute opening in wall 5' and is moved to open position by a can passing down the chute (Fig. 8).

In order to deliver cans from stacks II or III to the chute 63, a transversely extending roller conveyor 65 is provided (Figs. 8 and 9) and is inclined downwardly from its upper end, which is positioned below the delivery outlet of stack III, to its lower end, which is disposed closely adjacent and in position to deliver a can into tray 60. Thus cans delivered from either of stacks II or III will pass by gravity down the roller conveyor 65 onto tray 60, and from stack I directly to tray 60, thence to chute 63 and on to the opening and pouring unit G.

*Coin lock control*

Each of the gate shafts, such as 46' carries fixed to its forward end (Figs. 14–15) a handle such as 70' and a cam segment 71' is secured to the shaft forwardly of the supporting wall 5. The segment is provided with a hub 72' around which passes a strap 73' attached to one end of a helical tension spring 74' whose other end is anchored to pin 75' secured to a fixed part of the frame, thus urging the shaft in a clockwise direction until the segment 71' abuts a stop 76'. The segment 71' has a flange provided with an interior cam face 77' for operative engagement with a cam roller 78' rotatably mounted on a pin 79' forming a part of a slide carriage 80'. The carriage 80' comprises two parallel plates 81'—82' (Fig. 15) spaced apart axially of the shaft 41' and held together by pin 79' at one end and by a corresponding pin 83' at the other end which carries a roller 84', the rollers 78' and 84' being disposed between the plates 81'—82'. The carriage 80' is supported for sliding movement between a pair of lower studs 85' and a corresponding pair of upper studs 86' secured at their rear ends to a fixed plate 87. The pins being provided with wheels disposed in the space between the plates 81'—82' to guide the slide carriage in a parallel plane of movement. The slide carriage is provided with an elongated opening 87' through which the shaft 46' passes, to permit movement of the carriage in a direction to the right (Fig. 14), when the cam 77' moves into driving engagement with the cam roller 78'; it being noted that the leading edge of the cam surface comes to a feather edge of the segment rim to permit the cam to move between the roller 78' and a stop roller 88'. The segment is provided with a ratchet flange 89' for engagement with a pawl 90' held in operative engagement by a tension spring 91'. The ratchet and pawl are so arranged that the segment is permitted a limited driving movement of the carriage 80' before the pawl engages its ratchet. This limited movement is provided to permit the can feeler finger 49' to lock the shaft against further rotation in the event that no can is available for delivery, and thus permit the operating shaft 46' to be returned to its normal position so that a deposited coin may be returned. In the event that a can is in position to depress the feeler finger 49' the empty can lock is incapacitated, as previously described, and in so far as the empty can lock is concerned the shaft 46' may be further moved in a counter-clockwise direction—provided such movement is not prevented by a coin lock to be described hereinafter. A limited movement of the slide carriage 80' by the cam 77' also permits a time lag for the operation of the coin lock. Should the empty can lock and the coin lock be inactivated by the presence of a can at the delivery outlet and a suitable coin, or coins, the pawl 90' will have then engaged the first tooth of the ratchet and the operating shaft may not be returned to its neutral position until a full delivery operation has taken place.

Stack II is provided with an identical slide carriage 80'' and associated parts and stack III is provided with a substantially identical slide carriage 80''' and associated parts. It will be understood that if the handle 70' is moved in a counter-clockwise direction any movement imparted to the carriage 80' will cause a corresponding movement to the carriages 80'' and 80''', and similarly rotation of the shaft 70'' in a counter-clockwise direction will move the carriages 80'' and 80''', and carriage 80''' alone will be moved by rotation of the shaft 46'''. The carriages 80', 80'' and 80''' are urged to their normal or left hand position by means of a slide bar 92 supported at its opposite ends by studs 93—94 engaged in sloted openings provided in the bar 92 and the bar 92 is urged to the left by means of a tension spring 95. A depending arm 96 is rigidly secured to the forward end of the bar in abutting engagement with a stop 97 provided on an L bracket 98 secured to the carriage 80'''. Accordingly, the tension of the spring 95 urges the three carriages to the left. The carriage 80''' also carries pivotally secured thereto a coin feeler finger 99 secured to the outer end of a rod 100 (Figs. 14–15) rotatably journaled in the carriage 80''' and biased in a clockwise direction by a helical torsion spring 101. The rear end of rod 100 carries secured thereto a stop finger 102 whose forward end is notched for engagement, when in its lowered or horizontal position, with a stop 103. The finger 102 is provided with a downwardly extending lug 102a engageable with a fixed locking pin 104 so disposed as to raise the feeler finger 99 and locking finger 102 to elevated positions when the carriage 80''' and other carriages are returned to the position of rest (Figs. 14, 16).

When the carriages are advanced from the position of rest (Figs. 14–16) to the partially advanced position (Fig. 20) if a proper coin such as cn is in position the feeler finger 99 engages the coin and holds the locking finger 102 elevated so that it rides over the stop 103 as the carriages advance. At this time the coin cn rests on the upper edge of a vane 105 pivotally supported on the lower horizontal end 106 of a rod whose other end 107 extends upwardly and is normally held in vertical position (Figs. 17–18) by means of a helical tension spring 108. However, when the slide carriage 80''' moves forward from the position in Fig. 20 to the position in Fig. 21, a pin 109 carried on the rear of the lower lug of bracket 98 engages the rod 107 causing it and the coin rest vane 105 (Fig. 21) to rotate in a clockwise direction and thereby discharge the coin cn into a suitable coin receiver.

In the event that the proper coin or coins are not received on the vane 105 and the feeler finger fails to maintain the stop arm 102 in elevated position, the stop will be urged to its lower or horizontal position as seen in Fig. 22 and will engage the fixed abutment 103 and further movement of the carriages and of the can delivery mechanism will be prevented. In such event the vane 105 may be moved in a counter-clockwise direction by suitable means so as to return any improper or inappropriate coins to a coin return or reject receiver.

Intermediate the coin slot 17 (Fig. 1) and the vane 105 (Figs. 16–21) a suitable coin detector 110 of well known form is interposed for detecting and discarding spurious or improper coins. Proper coins pass from the detector 110 down either the five cent mouth 111 or ten cent mouth 112 and thence into the respective chutes 113 or 114. In the event that the no-can lock 49 (Fig. 13) prevents operation of a dispensing handle the operator may have his coin or coins returned by pressing a coin release button (Fig. 1) 115 adjacent the coin slot 17. This button is connected by suitable means (not shown) to the vane 105 (Fig. 21) so as to rotate the vane in a counter-clockwise direction and thereby deflect the coins to a coin return box 115a (Fig. 1) as is customary. Likewise, coins rejected by the coin detector 110 are delivered to the coin return box 115a.

Main drive

Referring more particularly to Figs. 23–25 and 1: the main drive is encased in a suitable oil-tight housing 125 disposed adjacent to and serving to support the can opening and pouring unit G. A main drive shaft 126 is suitably journaled in the housing 125 and carries fixed on its rearwardly extending outboard end a cam 127 (see also Fig. 4) engaging a cam roller 128 carried on the mid-point of a cam arm 129 pivotally mounted at one end on a stud 130 carried on the rear wall of housing 125 and whose outer end is provided with a roller 131 abuttingly engaged the push rod 38 (see also Figs. 2–4) for causing rocking motion of the trays of stacks I, II and III as previously described.

The main shaft 126 carries secured intermediate its ends within the housing 125 a main cam 132 having secured to its outer periphery a worm wheel 133 in driven engagement with a worm 134 carried on a shaft 135 which has secured to one end a pinion gear 136 in driven mesh with a complementary gear 137 secured to the adjacent end of a shaft 138 which carries at its opposite end a gear 139 in driven engagement with a driving gear 140 carried on a shaft 141 which is suitably connected, as by a flexible shaft 142 with a suitable power source, such as an electrical motor 143 (Fig. 2), also diagrammatically shown in Fig. 23.

Electrical drive circuits

The motor 143 is operatively connected to a suitable electrical source by means of lines 144. Connected in parallel across said lines are suitable switches, such as micromatic switches 145 and 146 one of which must be closed to energize the main drive motor 143. The switch 145 is actuated by a cam 147 carried on the forward outboard end of the main shaft 126 (Fig. 23) which is closed until a complete cycle of operation is completed. Switch 146 is carried on the can opening and pouring unit G and is actuated by a roller 148 in position to be engaged by a can delivered to unit G from the chute 63, so that closing of the switch 146 initiates the operative cycle.

Cup dispensing mechanism

The forwardly extending outboard end of main shaft 126 carries a miter gear 149 in driving engagement with a mating gear 150 drivingly connected to one end of a flexible shaft 151 (Figs. 25 and 1) whose upper end is connected to the cup dispenser actuating member 11. The parts are so arranged that a cup is dispensed from one of the dispensers 9—9' upon each complete rotation of drive shaft 126. When a cup is dispensed (Fig. 1) it passes from the outlet 13 of the cup chute 12 and into the tube 14 (Figs. 1, 2, 14 and 15) suitably supported, as by a bracket 152, in fixed register under the outlet 13. The side wall of the tube 14 is provided with a slot 153 into which is disposed a spring wire finger 154 pivoted at 155 and extending rearwardly beyond sleeve 152 and through an elongated slot 156 in the slide bar 92. The finger 154 is positioned to engage the side wall of a cup beneath its lip bead and support the cup in tube 14 until a predetermined forward movement of the slide bar 92 at which time the finger 154 is moved outwardly to release the cup, which then drops through the inclined tube 157 into suitable supporting fingers 158 which hold the cup (Figs. 1 and 2) in place over the drain 15, at the opening O and in position to receive the contents of a can operated upon by the opening and pouring unit G.

Can opening and pouring mechanism

Can opening drive

The main drive cam 132 (Figs. 24–25) is provided with a cam groove 160 in its front face and a cam groove 161 in its rear face (see also Figs. 45–46 where the tracks of the cam grooves are fully shown). Engaged in the groove 160 is a cam roller 162 carried on an arm 163 intermediate an end pivotally mounted on a pivot shaft 164 supported in the housing 125 and whose opposite end is provided with a gear segment 165 (Figs. 24–25) in driving engagement with a gear pinion 166 fixed on the forward end of a stub shaft 167 journaled in the gear housing 125 and carrying fixed near its rear end a spur gear 168 in driving engagement with a pinion gear 169 fixed on the rear end of a shaft 170 suitably journaled (Fig. 27) in a hollow sleeve 171 and at its forward end carrying fixed thereto a driving gear 172 engaging a driven gear 173 fixed on a shaft 174 journaled in a housing 175 of the can opening and pouring unit G and carrying fixed to its other end a spur gear 176. The gear 176 is in driving engagement with a gear rack 177 fixed to a cross-head 178 slidably disposed and suitably guided in the housing 175. From this it will be seen that as cam 132 is rotated the cam groove 160 causes arm 163 to oscillate about its pivot 164 to thereby rotate the rack pinion 176 in the direction and to the degree predetermined by the cam groove 160 (Fig. 45); and the rack 177 and attached slide 178 are reciprocated accordingly. This movement provides for the actuation of the can opening means to be hereinafter described.

*Can pouring drive*

The cam groove 161 (Figs. 24 and 25) is engaged by a cam roller 180 mounted on an intermediate portion of an arm 181 pivoted at one end on the shaft 164 and provided at its other end with a gear segment 182 in driving engagement with a cooperating gear segment 183 provided on one end of a member 184 freely journaled (Fig. 27) on the shaft 167 and provided with a second gear segment 185 concentric to the pivot shaft 167 and in driving engagement with cooperating segmental gear teeth 186 provided on the hollow shaft 171. The hollow shaft 171 preferably is formed as a unitary part of, or securely fixed to, the housing 175 of unit G, is suitably rotatably journaled in and axially fixed in the gear housing 125 and serves as the sole support for the housing 175. It will be understood from the foregoing that as the cam 132 rotates the cam track 161 oscillates the arm 181 and through the gear train above described the unit G housing 175 will be rocked about the axis of its supporting sleeve 171 (Fig. 27) in the direction and to the degree predetermined by the cam groove 161 whose path is fully illustrated in Fig. 46.

*Can opening mechanism*

Referring more particularly to Figs. 26–29, inclusive: the main slide member 178 is provided with suitable parallel guideways in which are slidably disposed slide blocks 190 and 191 which carry secured to their lower respective faces a clamping jaw 192 for engaging the rear end of a can end 193 for engaging the front end of the can. The block 190 threadingly engages the screw stud 194 whose head is slidably disposed in a bore 195 provided in the block 191 so as to provide limited movement between the blocks 190 and 191. The block 190 also is threadingly engaged by a stud screw 196 whose head is slidably disposed in a sleeve 197 which is fixed in a bore provided in an end block 198 secured to the main slide 178 and serving as a limit stop for the outward movement of the block 190. A helical compression spring 199 is seated in the sleeve 197 and normally urges the head outwardly to draw the blocks 190 and 191 toward the stop block 198. The slide block 191 is provided with a bore 200 in which is slidably disposed a screw stud 201 which is threadingly engaged in a slide block 202 which is arranged in tandem with the blocks 190 and 191 in the same guideways. It will therefore be seen that as the blocks 190 and 191 are urged to the left by the spring 199 the block 202 is similarly urged. A stop pin 203 (Figs. 26 and 28) serves to limit the movement of the block 202 in that direction. The block 202 is provided with a vertically disposed slot into which is received the upper end of a can piercing member 204 which is held vertically in the following manner. Block 202 is provided with a horizontally disposed bore in which is disposed the helical compression spring 205, one end of which is seated in the bottom of the bore and the other end of which is engaged by a nut 206 threaded on the inner end of a pin 207 having an enlarged outer end 208 seated in a corresponding enlarged bore. The opening blade 204 (Fig. 39) is provided with a hole 209 corresponding to the enlarged head 208 and with an outwardly extending slot 210 corresponding in width to the diameter of the shank of pin 207. Accordingly, by grasping the head 211 (Fig. 29) of the pin 207 and pulling the pin outwardly the blade 204 may be moved upwardly, the shank of pin 207 passing through the slot 210 until the hole 209 is in alignment with the pin enlargement 208, and then by releasing the head 211 the spring urges the pin inwardly to lock the opening blade in position. The block 202 has rigidly secured thereto a stop arm 212 (Figs. 26 and 28) provided at its opposite end with a finger 213 which is in alignment for engaging a stop pin 214 which is resiliently urged outwardly by helical compression spring 215 to provide a slight yield at the end of the forward stroke of the block 202 so as to prevent damaging the opening blade 204 as it moves into cutting engagement with the forward end of a can to be opened. The cutting point of the blade 204 is disposed in position to engage the forward end of a can closely adjacent the lower side wall when the can is in position to be operated upon. A venting blade 216 is provided with a threaded shank 217 which passes through a lower extension of the stop block 198 and is locked in position by a nut 218. The venting blade 217 is disposed in alignment with a hole provided in the gripping jaw 192 so that the blade may pass through the hole and into placing engagement with the rear end of a can to be operated upon; and the venting blade is so disposed as to pierce the can end near the upper side wall, or diametrically opposite the opening hole pierced by the pouring blade.

Referring more particularly to Figs. 35, 36 and 37: it will be seen that the venting blade 216 is provided with a forwardly downwardly extending face terminating in a cutting point 219, the upper portion of the blade rearwardly of the inclined face being recessed at 220 and the lower portion of the blade rearwardly of the cutting point 219 being provided with a grooved recess 221, so as to provide a suitable vent when the blade has perforated the end of the can. In order to suitably provide for the venting of charged beverages, such as beer, I have provided an alternative venting blade (Fig. 37a) in which the blade is designated in its entirety as 222 and is provided with a longitudinal bore 223 in communication at its forward end with a bore 224 extending outwardly through the cutting face of the blade adjacent its upper portion and being in communication at its rear end with a suitable tube 225 which serves to conduct any gas or entrained liquid downwardly to a suitable collection point, such as the tank I (Figs. 1 and 2) in the base of the cabinet. It will be seen from Figs. 35–38 that the opening blade, whether of the type shown in Fig. 35 or of the type shown in Fig. 37a, will pierce the vent opening 226 of triangular form with the cut flap 227 disposed inwardly.

Suitable means in the general form of a rack are provided for holding the can to be operated upon. This rack comprises a forward cradle portion (Figs. 27 and 28) and a rear cradle portion. The forward cradle portion comprises laterally disposed rounded slide bars, such as 230 and 231, rigidly secured respectively to downwardly extending housing portions; the rear ends of the bars 230—231 being provided with beveled inclines such as 232, for the purposes to be hereinafter described. A rear cradle portion in the general form of a trough (Fig. 23) 233 is pivotally supported along one edge from the housing 175 about a pivotal axis 234 and is normally held in a horizontal position (Figs. 23 and 26) by a helical torsion spring 235. It is to this rear portion of the cradle that the micro switch 146 is attached with its actuating roller 148 (Fig. 23) extending within the trough. The cradle trough 233 has fixed thereto a trip arm 236 adapted for engagement with a stop pin 237 carried on the gear housing 125. By this construction a flap is provided for discharging cans from the can opening and pouring mechanism after the can has been emptied, the cradle portion 233 being then tipped about its pivotal axis 234, which is parallel to the axis of the can, to the position indicated in Figs. 32 and 33.

Figure 32:
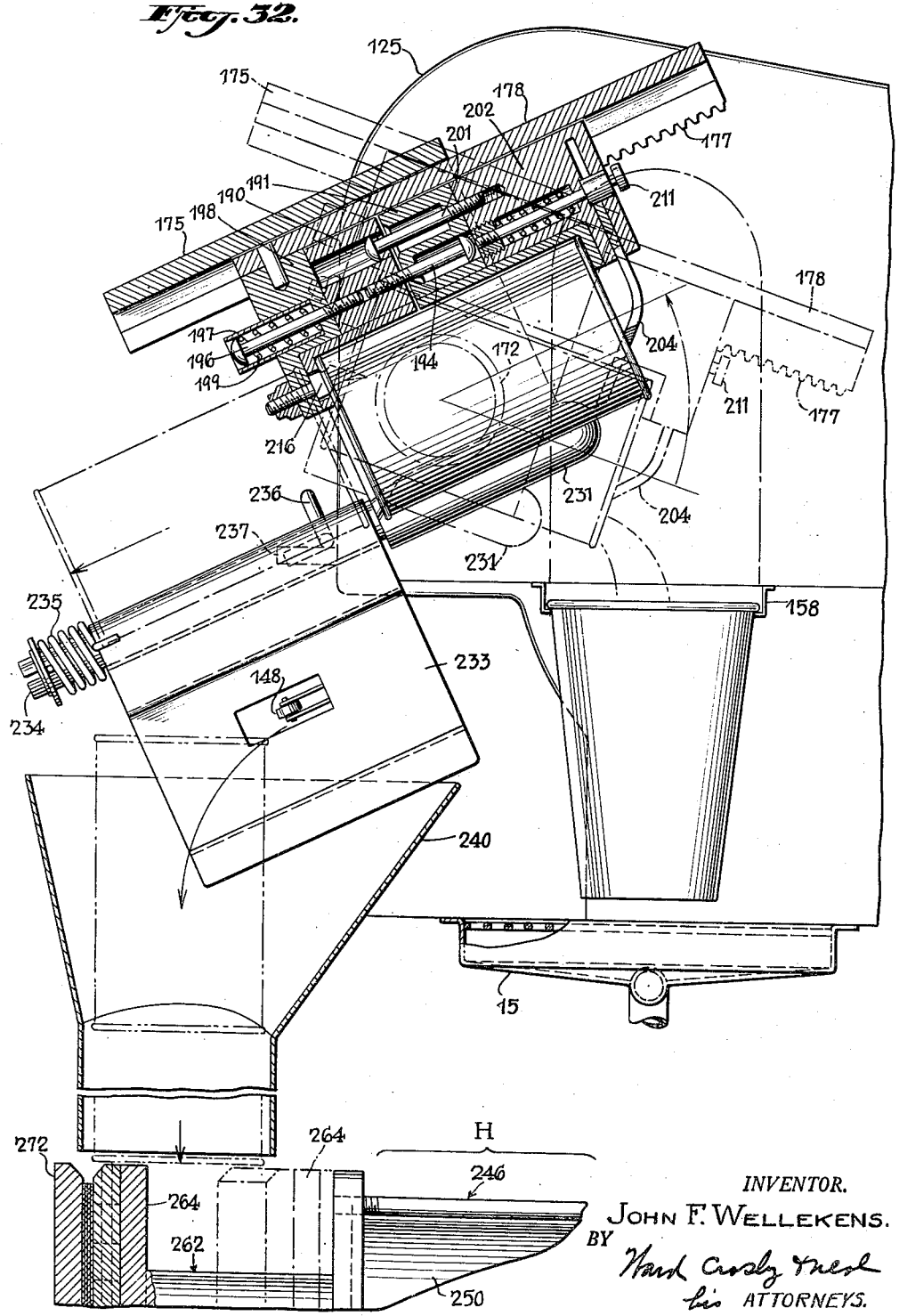
Fig. 32 is a side elevational view, partly in section showing the opening and pouring mechanism in its pouring and discharge operational positions and showing the discharge chute for delivering an empty can to the crushing unit.

Referring to Fig. 32: it will be seen that suitable discharge chute 240 is provided in registered alignment with the downwardly tipped discharge flap 233 so as to catch the empty cans discharged therefrom, and align the discharged empty can in a vertical position preparatory to its delivery, by gravity, to the can crushing unit H, which will now be described.

*Crusher unit*

The crusher unit H preferably comprises (Figs. 40–41) an electrical drive motor 245 and a fluid actuated crusher designated in general as 246; both the motor and fluid unit being unitarily mounted on a base plate 247. The fluid actuated unit in its preferred form utilizes liquid. This unit comprises a forward end wall 248 and a rear end wall 249 between which are held in liquid-tight engagement respective opposite ends of an outer tubular barrel 250 and an inner (Fig. 42) cylindrical tube 251; the end walls 248—249 are held in a sealed position with the tubes 250—251 by means of suitable tie bolts (Fig. 43), such as 252, 253, 254, 255 and 256, having their forward ends threadingly engaged in the forward wall 248 and their opposite rear ends passing through the rear wall 249 and threadingly engaged by suitable nuts such as 257. The inner tube 251 in conjunction with the end walls 248—249 provides a cylinder chamber 258 in which is operatively disposed a piston head 259. The annular space between the inner tube 251 and outer tube 250 provides a liquid reservoir 260. Suitable relief openings such as 261 are provided at the forward end of the cylinder chamber 258 to place the same in communication with the reservoir 260 forwardly of the piston head 259; from which it will be seen that the present device is a one-way actuator. The piston head 259 is carried on the rear end of a piston rod 262 passing through suitable packing gland 263 disposed in the front plate 248. The piston rod 262 extends outwardly beyond the face of the forward plate 248 and carries on its outboard end a cross-head 264 rigid therewith and preferably formed of one piece with the piston rod. The cross-head is urged rearwardly on its return stroke by a pair of suitable helical tension springs such as 265—266 whose forward ends are engaged in oppositely disposed sides of the cross-head 264 and whose rear ends are anchored to the rear plate 249. A pair of oppositely disposed wing plates 267—268 have their inner edges articulated by means of a vertically extending pin 269 supported on the central vertical axis of the cross-head 264. A pair of oppositely disposed stop pins 270—271 are rigidly fixed in the forward plate 248 and extend forwardly through openings in the cross-head 264 and have their forward ends rounded and disposed adjacent the outer edges of the wing plates 267—268 so that as the cross-head 264 is moved rearwardly on its return stroke the wings are caused to pivot about their axis 269 to form a re-entrant angle therebetween. A fixed head 272 is rigidly held in spaced position forwardly of the wall 248 by means of a pair of upper rods 273 and a pair of lower rods 274 rigidly supported at their rear ends in the forward wall 248. The movable cross-head 264 (Figs. 41–42) is provided adjacent its lower edge with a finger 275 extending forwardly from and in alignment with the pin 269 for supporting engagement with the bottom of a can to be crushed; a registered opening 276 being provided in the fixed head 272 to permit the passage of the finger 275 therethrough. It will thus be seen (Figs. 40–41) that when the cross-head is retracted an empty can will be received between the movable crushing wings 267—268 and the fixed head 272; and that as the movable head 264 is urged forward on the power stroke the wings will engage the can which is held centered by the re-entrant angle and will progressively crush the can into the flattened position shown in the broken lines (Fig. 41), and at the latter part of the crushing stroke the wings 267—268 will have assumed a position of abutment against the movable cross-head 264. As soon as the cross-head commences its rearward stroke, under the influence of the return springs 265—266, the supporting finger 275 moves away from the fixed head 272 and permits the crushed can to drop outwardly and into the collection pan or drawer I (Figs. 1 and 2).

Fluid pressure for actuating the piston 259 is supplied by means of a gear pump comprising a driving gear 280 and a driven gear 281 mounted in a pump cavity provided in the rear wall 249 and closed by a cover plate 282 rigidly secured to the wall 249. The gear 281 is mounted on a shaft 283 whose opposite ends are journaled in the plate 249 and cover 282 and the driving gear 280 is carried on a driving shaft 284 which is similarly journaled and extends outwardly to a flexible coupling 285 which serves to connect it to the shaft of the drive motor 245.

The gear pump is provided with an outlet port 286 which is in communication with an annular outlet passage 287 provided on the valve member 288 rigidly secured in the wall 249 in liquid-sealing engagement therewith and openings 289 serve to place the annular passage 287 in communication with a valve bore 290 which is in communication through openings 291 with an annular inlet passage 292 which in turn is in communication with a cylinder inlet port 293; so that with the parts as shown in Fig. 44 fluid pressure from the pump is free to pass into the cylinder chamber 258 (Fig. 42) rearwardly of the piston head 259 to force the same forwardly. Fluid from the forward end of the cylinder chamber passes outwardly through the openings 261 into the reservoir 260. Disposed within the bore 290 is a valve stem 294 having an enlarged head 295 slidably engaged within the bore 290 and an axially spaced rearwardly disposed head 296 slidably disposed in the passage 290. The stem 294 is provided with an axial bore 297 whose outer end is adapted for seating engagement on a conical valve pin 298 carried on the inner end of a screw plug 299; a compression helical spring 300 being disposed between the plug 299 and rear head 296 to normally urge the valve sleeve 294 away from the conical seat 298. The head 296 is provided with a plurality of peripherally disposed axially extending holes 301 through which bleeding fluid may pass from the bore 297 past the valve 298 and into an annular passage 302 and thence outwardly through a return port 303 which is in communication with the inlet side of the gear pump 280–281. The annular passage 302 is likewise in communication with a port 303a serving to place the pump inlet 303 in communication with the reservoir 260 (Figs. 43 and 44). It will be understood that as the electrical motor 245 is operated and pressure fluid is furnished by the pump the valve stem 294 is moved until it is seated against the pin 298 to close this valve, and upon the actuating pressure being relieved and the valve stem 294 being opened by the spring 300 a passage is provided between the pump inlet and main valve passage 290. At the opposite end of the bore 290 a reduced bore 304 is provided and the outer shoulder provides a valve seat against which a check valve ball 305 is urged by means of a plunger 306 and a rearwardly disposed helical compression spring 307 seated in a screw plug 308 threadingly engaged in the valve member 288 to provide means for adjusting this check valve which acts as a relief valve. This relief valve is in communication with an annular passage 309 which in turn communicates with a port 310 in communication with the reservoir 260. The screw stem 308 is secured in position by a nut 311 and a locking cap nut 312. It will be understood that the check valve ball 305 is urged against its seat with a predetermined pressure to insure the required crushing force to flatten an empty can but yieldable to relieve the pressure when a can has been flattened or should a can resist flattening at a predetermined pressure; whereby the mechanism is prevented from being overstrained.

OPERATION

*Loading supply magazine*

Figure 6:
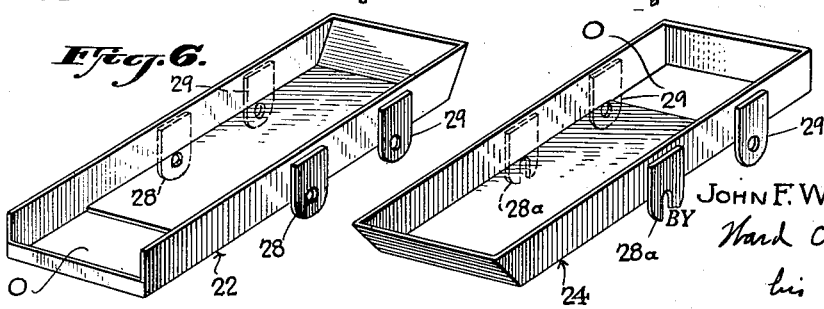
Figs. 6 and 7 are perspective views showing typical of the individual tray units.
Figure 7:
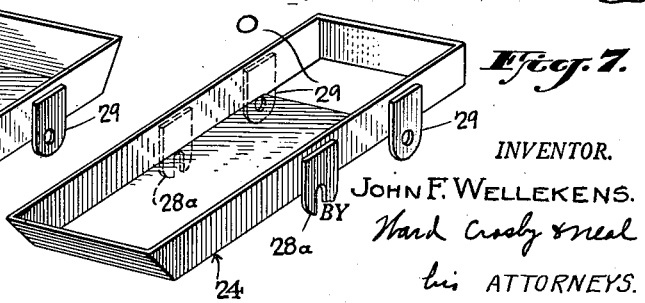
Figure 30:
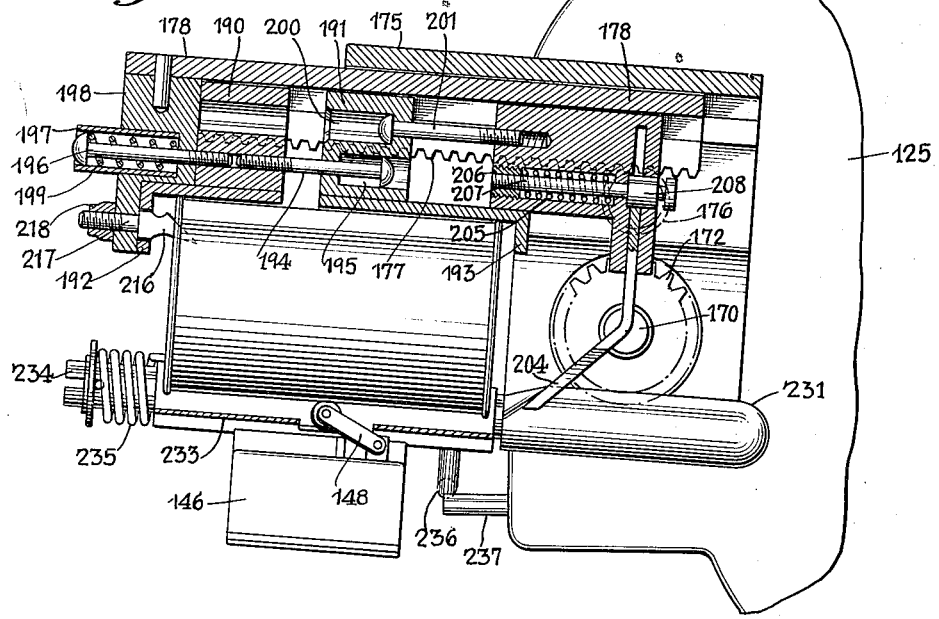
Figs. 30 and 31 are elevational views, partly in section, showing the mechanism of Figs. 26-29 in different operational positions.

Access is had to the supply magazine through a removable door or panel 5a (Fig. 2), which for purposes of convenience in the present embodiment is unitarily removable with the front panel 7 and cup dispensing mechanism E. With the magazine disposed as indicated in Fig. 3 (as viewed from the left hand side of the machine) cans are placed in the respective stacks from the front end of the trays, preferably starting with the lower end of the stack, as follows. The lowermost tray 24 is pivoted clockwise about its pivot pin 31, which is permitted by the slotted end of lug 28a, so as to thereby raise the front end of the lowermost tray 24 to provide for ready access to the tray 25a. Cans are then inserted through the opening O in front end of tray 25 and are successively passed through the opening O until the lower tray 23 is filled and until the tray 25a is also filled. The lowermost tray 24a is then returned to its normal position where the lug 28a rests on its cross rod 26. The next uppermost tray 24 is similarly rotated about its rear pivot 31 to permit access to the next lower tray 25 through the open forward end of which the next lower tray 24 is loaded, and the tray 25 is loaded, etc., until the remaining trays 25 and 24 are loaded. The upper tray is loaded from its forward end which is facilitated by the cut away forward wall (Fig. 6). The door 5a and connected forward panel 7 and cup dispensing mechanism E is then returned to operating conditions and the machine is connected to a suitable source for electrical energy for operation of the drive motors and the refrigerating or other thermal control unit such as T.

*Can selection*

The operator selects one or the other of the flavors or kind of liquid desired and engages the corresponding handle 70 and deposits the required coin or coins in the coin slot M (Fig. 1). If the corresponding stack is supplied with the can product desired the can feeling finger 49 (Fig. 8) is depressed so as to release the mechanism for the first interim of operation and if the proper coin or coins have been deposited on the coin vane 105 (Fig. 17) the coin feeler finger 99 is held in elevated position (Fig. 20) so as to permit the further rotation of the actuating shaft 46 whereby the actuating cam 77 moves the slide carriage 80 and the forward movement of this carriage causes pin 109 (Figs. 20-21) to strike the coin support vane 105 causing it to be tipped about its pivotal point 106 to discharge the coin or coins into the coin receiver. On the contrary, should the stack of cans selected be empty the can feeler finger 49 is raised causing the locking cam 55 (Fig. 13) to engage the locking pin 53 to prevent rotation of the actuating shaft 46, in which event the deposited coins may be returned by the release pin 115 (Fig. 1). Likewise, if the required proper coins are not deposited the coin lock 102 (Fig. 22) comes into engagement with the stop 103 and prevents further dispensing operation.

*Can dispensing and transfer*

As previously explained, once one of the shafts 46 is rotated to an extent where the can has been checked and the coin has been checked and the carriage is found free from movement the pawl 90 engages the first tooth of ratchet 89 and thereafter the handle must be rotated through its complete anti-clockwise cycle until the pawl 90 has passed over the upper end of ratchet 89 before the parts may be returned to their initial position by means of the return spring 74. As above explained, this counter-clockwise rotation of the actuating shaft 46 moves the rear gate 45 (Figs. 8, 10-12) to a position to release a can in the delivery sleeve 40. If this can is in stack I it passes directly onto the transfer tray 60 (Figs. 8 and 9); whereas if it is in one of the stacks II or III it passes onto the inclined roller conveyor 65 and thence to the transfer tray 60. The weight of the can is sufficient to compress the spring 62 (Fig. 8) and release the tray 60 to its downwardly tilted (broken line) position, whereby the can is discharged onto the forwardly and downwardly inclined delivery chute 63, down which it rolls, striking the flap door 64 causing the same to open and permit passage of the can from the thermally insulated compartment outwardly and to the opening and pouring unit G; the can being delivered onto the rear cradle portion 233 engaging the roller 148 of the trip finger and thereby closing the contacts in switch 146, which starts the cycle of operation as previously explained.

*Opening and pouring cycle*

Figure 31:
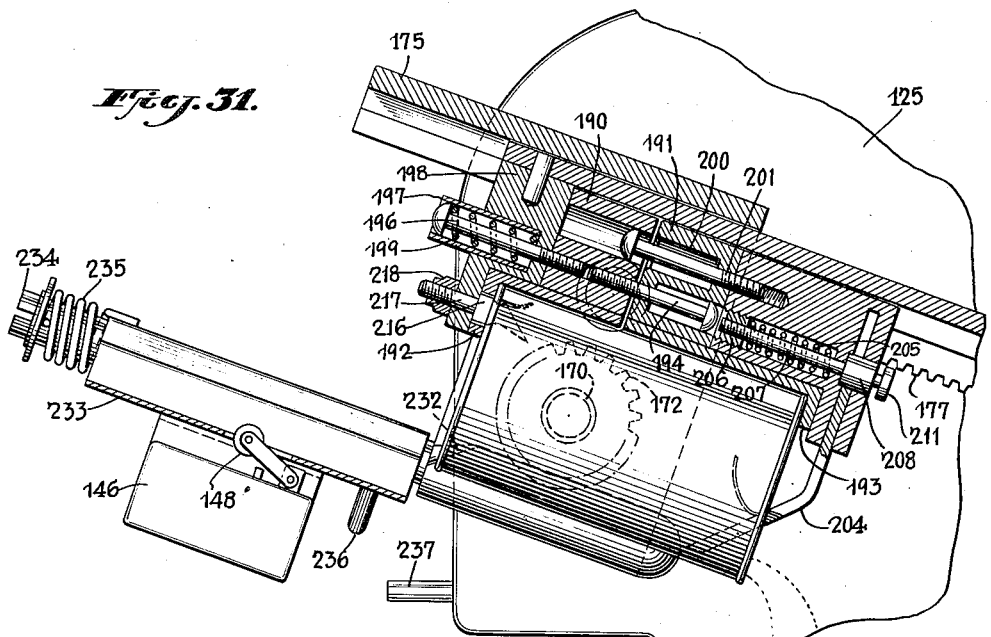

The timing of the opening and pouring cycle will be understood by reference to Figs. 45-46. When the can is delivered from the chute 63 the forward cradle 230—231 (Fig. 23) and rear cradle 233 are horizontal (Fig. 29). When the can is delivered on the rear cradle the switch 147 is open and the can trips the switch 148 thus starting both motors 143 and 245. The motor 245 operates the crusher H to crush the empty can previously discharged from the preceding dispensing operation. The motor 143 rotates cam 132 and cam track 161 tips the cradle slightly about the rocking axis of the housing 175, thereby permitting the torsion spring 235 to urge the cradle trough 233 upwardly until it engages stop 233a. This slight upward movement elevates the can to the proper level to be punched. Then cam track 160 moves cam roller 162 and the rack 177 (Fig. 26) to first close the jaws 192—193 and move the can axially up the bevel inclines 232 of the fixed cradle 230—231 and entirely onto the fixed cradle. While the can is being thus moved axially the perforating blades 204 and 216 have perforated the opposite ends of the can. In the meantime, the rocking cam track 161 has rocked the housing 175 in such timed relation (Fig. 46) that the can has started to assume its pouring position and the contents are being poured into a cup (Figs. 31-32). The cam tracks 160 and 161 have dwell portions, the dwell of track 161 terminating short of the dwell of track 160 so that the body 175 is caused to rock in the reverse direction and as the can is being reversely inclined the perforating blades and holding jaws are being expanded and the can is being moved from the forward cradle portion onto the rear cradle portion 233 so that when the cradle trip arm 236 strikes the trip pin 237 the can rests freely upon the flap 233 ready to be discharged.

A point of considerable importance in the present invention resides in the fact that the device is so constructed and arranged that an individual drink may be dispensed from a sealed container directly into the drinking receptacle (preferably of the one-piece type of receptacle such as a paper cup), without any intervening member (such as a conduit, spout, funnel, dispensing tank, etc.) coming in contact with the liquid from the time it leaves its sealed container and it is delivered into the receptacle from which the user consumes the liquid. This feature is of the utmost importance for sanitary reasons, as well as for palatable reasons—in the latter instance especially where several different flavors or kinds of beverages are being dispensed.

It is to be particularly noted in connection with the foregoing operation that immediately upon the can being emptied it is tipped rearwardly to the opposite angle of inclination to prevent further dripping from the pouring end of the can; and the inevitable drop or drops of fluid which usually flow down the outer lower edge of the can may freely pass between the spaced apart rigid members 230—231 forming the forward cradle portion—it being noted that such drops or particles of fluid may freely pass downwardly without obstruction (Fig. 32) into the hopper 240 and thence downwardly into the collection drawer or bin I (Fig. 1), before the can is moved onto the pivotal rear cradle portion 233.

It will be seen from Fig. 32 that after the can is moved from the solid line position to the dotted line position the pivotal cradle portion or flap 233 is fully tipped downwardly to discharge the empty can into the hopper 240. Thereafter the housing 175 is rocked in the opposite direction so as to move the parts in the position shown in Fig. 33 to the position shown in Figs. 23 and 26. When the housing reaches its horizontal or initial position the flap 233 is returned to its horizontal position; the trip pin 236 being held by the stop pin 237, thus resisting the torsion spring 235 from moving the flap 233 upwardly against the stop 233a.

At the time that the can is discharged from the flap 233 the switch arm 148 is released so as to open the switch 146. However, at this time the cam 147 (Fig. 23) has closed the switch 145 and this permits the main drive motor to return the can opening and pouring mechanism to its position of rest and as soon as this position of rest is reached the switch 145 is also open to stop the main drive motor 143.

Can crushing

The crushing of a can takes place during the opening and pouring period of the next succeeding can. At the time that a can is delivered to the cradle 233 (Fig. 23) the control switch 145 is open and the initiation of the cycle is under control of switch 146, which is closed by engagement of a can with the contact roller 148 and as previously explained this starts the operation of the main drive motor 143 and the can crushing motor 245. The mechanism is so timed that the crushing of a can is completed and the crushing jaws are open to discharge the crushed can and to receive the next succeeding can delivered into the hopper 240. After the can is delivered into the hopper 240 it stays in this position until the crushing operation is started by the next succeeding cycle.

Timing of opening and pouring cycle

While the timing of the opening and pouring unit G may be varied within practical limits, I have found that the present embodiment of the invention operates entirely satisfactorily with the following time cycle, reference being had to Fig. 46 showing relative timing of the cam groove 161 operating the can positioning mechanism of the unit G.

|  | Seconds |
| --- | --- |
| Tilting forward | 3½ |
| Pouring | 16½ |
| Tilting rearwardly | 2 |
| Ejecting | 4 |
| Return to horizontal | 2 |
| At rest | 2 |
| Total cycle | 30 | for one rotation of the cam.

With reference to Fig. 45 showing relative timing of the cam groove 160 operating the can opening mechanism of unit G, the following relationship to the can positioning is noted for the present embodiment of the invention.

The can perforators or blades remain open until the tilting of the can commences, so that the can is perforated after some tilting. This prevents leakage from the vent hole at the rear and insures discharge from the front end into the cup. The perforators remain in closed position until after the contents of the can has been poured and the can has been tilted rearwardly. Then during the ejection interval the perforators open, or expand, and are removed from contact with the can before final ejection and continue to open to their initial position while the can cradle is returned to its initial horizontal position.

Having thus described my invention with particularity with reference to a presently preferred form of the same, it will be obvious to those skilled in the art after understanding the invention, that various changes and modifications may be made therein without departing from the scope of the invention, and it is my intention to cover in the appended claims such changes as come within the scope of the invention.

What I claim is:

1. In apparatus for dispensing liquids from sealed cans made of suitable perforatable material, the combination of a cabinet comprising a thermally insulated chamber having means therein for holding a stack of said cans of liquids to be dispensed, a cup compartment in front of said chamber, cup dispensing mechanism contained within said chamber for delivering individual cups to a receiving station, can opening and pouring mechanism disposed below said can holding and cup dispensing means for opening a selected can of liquid and pouring the contents therefrom into a cup at said receiving station, means disposed beneath said can holding means for delivering individual cans to said opening and pouring mechanism, can crushing mechanism disposed beneath said opening and pouring mechanism for receiving a can therefrom and crushing the same, and mechanism for operating said cup dispenser mechanism, said can delivering mechanism, said opening and pouring mechanism and said crushing mechanism in timed sequence once in each operational cycle.

2. Apparatus for opening and pouring liquid from a can of perforatable material in which said liquid is sealed, comprising a rack for holding a can, an opening blade and a venting blade normally mounted in spaced relation with said can in an axial direction, mechanism for effecting relative movement between said can and said blades, said opener blade being disposed diametrically opposite to said venting blade, and mechanism for tipping said can so as to pour said liquid from its pouring opening and thereafter inclining said can in the reverse direction to thereby prevent dripping from the pouring end.

3. Apparatus for opening and pouring liquid from a can of perforatable material in which said liquid is sealed, comprising a rack for holding a can, an opening blade and a venting blade normally mounted in spaced relation with said can in an axial direction, mechanism for effecting relative movement between said can and said blades, said opener blade being disposed diametrically opposite to said venting blade, mechanism for moving the can from a rear position to a forward pouring position, mechanism for tipping said can so as to pour said liquid from its pouring opening and thereafter inclining said can in the reverse direction to thereby prevent dripping from the pouring end, and means for removing the can to the rearward position and discharging the same.

4. Apparatus for opening and pouring liquid from a can of perforatable material in which said liquid is contained, comprising a cradle for supporting the can in a generally horizontal position, movable jaws for gripping a can endwise, an opener blade having a puncturing portion disposed to engage a lower zone of an end of a can resting on said cradle, a vent blade spaced from said opener blade in a direction longitudinally of said can and disposed to engage and puncture the upper zone of the opposite end of said can, mechanism for effecting relative movement between said gripper jaws and between said blades and the correspondingly respective can ends in a direction longitudinally of said can, said blades being mounted to thereby pierce a pouring opening in one end of said can adjacent its lowermost side wall and a vent opening in the opposite end of said can adjacent its upper side wall, and mechanism for inclining said can to thereby pour liquid therefrom.

5. Apparatus for opening and pouring liquid from a can of perforatable material in which said liquid is contained, comprising a housing mounted for pivotal movement about a rocking axis transverse to the longitudinal axis of a can to be operated upon, a cradle carried by said housing for receiving a can disposed on its side wall, movable clamping jaws engageable with respective ends of said can, opening and venting means for puncturing respectively opposite ends of said can, mechanism for moving said clamping means into holding engagement with said can and said puncturing means into operative engagement with said ends, and mechanism for rocking said housing about said transverse axis to incline said can to pouring position and thereafter to incline said can in the reverse direction.

6. Apparatus for opening and pouring liquid from a can of perforatable material in which said liquid is contained, comprising a cradle for supporting a can, movable clamping jaws engageable with respective ends of a can supported on said cradle, pouring opening and venting blades for puncturing respectively opposite ends of said can while thus supported and engaged, said cradle comprising a forward part and a rear part, said rear part serving to receive a can and said forward part in conjunction with said clamping jaws serving to hold the can in its pouring position, said forward cradle part and said jaws and said blades being mounted for simultaneous pivotal movement about an axis transverse to the longitudinal axis of said can and said rear cradle part being pivotally movable about an axis extending lengthwise of said can, mechanism for moving said clamping means into holding engagement with said can and said blades into puncturing engagement with said ends, and mechanism for pivotally moving said forward cradle part about said transverse axis to incline said can to pouring position and thereafter to incline said can in the reverse direction.

7. Apparatus for opening and pouring liquid from a can of perforatable material in which said liquid is contained, comprising a housing mounted for pivotal movement about a rocking axis transverse to the longitudinal axis of a can to be operated upon, a cradle carried by said housing for receiving a can disposed on its side wall, said cradle providing a forward part having a pair of laterally spaced bars fixed to said housing and providing therebetween an opening for the free passage of drip from said can downwardly therethrough, movable clamping jaws slidably mounted in said housing for movement axially of said can for engagement with respective ends of said can, pouring opening and venting blades slidably mounted in said housing for puncturing respectively opposite ends of said can, mechanism for moving said clamping means into holding engagement with said can and said puncturing means into operative engagement with said ends, mechanism for rocking said housing about said transverse axis to incline said can to pouring position and thereafter to incline said can in the reverse direction, said cradle also providing a rear part for receiving a can in transit to and from said forward cradle bars and pivotally movable to discharge a can, and a trip operable upon said reverse rocking movement of said housing for effecting said pivotal discharge movement.

8. Apparatus for opening and pouring liquid from a can of perforatable material in which said liquid is sealed, comprising a support for holding the can, said support being mounted for rocking movement about an axis transverse the longitudinal axis of a can held thereon, a pouring opener blade having a cutting portion disposed to puncture a can near one side when held on said support, a vent blade disposed to puncture a can near its diametrically opposite side, mechanism for moving said blades to thereby pierce a pouring opening in said can adjacent one side wall and a vent opening in said can adjacent its opposite side wall, and mechanism for inclining said can support about its transverse axis to thereby pour liquid therefrom.

9. Apparatus for opening and pouring liquid from a can of perforatable material in which said liquid is contained, comprising a housing pivotally mounted for rocking movement about its transverse axis, a can support carried by said housing for holding a can to be operated upon, a main carriage slidably disposed in said housing for longitudinal movement and carrying a gear rack and a can venting blade, a rear end gripping jaw movable with and with respect to said venting blade, a second carriage slidable longitudinally in said first carriage and movable with and with respect to said first carriage, a can pouring opening blade carried by said second carriage, a front-end gripping jaw movable with and with respect to said opening member, a driving pinion engaging said rack for reciprocation of said first carriage, said gripping jaws and blades being operatively connected with said main carriage for actuation thereby, and mechanism for rotating said housing about its pivotal axis.

10. Apparatus for opening and pouring liquid from a can of perforatable material in which said liquid is contained, comprising a housing pivotally mounted for rocking movement about its transverse axis, a main carriage slidably disposed in said housing for longitudinal movement and carrying a gear rack and a can venting blade, a rear end gripping jaw movable with and with respect to said venting blade, a second carriage slidable longitudinally in said first carriage and movable with and with respect to said first carriage, a can opening blade carried by said second carriage, a front-end gripping jaw movable with and with respect to said opening member, a driving pinion engaging said rack for reciprocation of said first carriage, said gripping jaws and blades being operatively connected with said main carriage for actuation thereby, a receiving and discharge flap pivotally mounted about a longitudinal axis for movement from a receiving position to a discharge position for normally holding said flap in receiving position, supporting means held in fixed position from said housing forwardly of and in longitudinal alignment with said flap for positioning said can in pouring position, said can being movable by said gripping jaws from said flap to said forward supporting means for pouring and back to said flap after pouring, mechanism for rotating said housing about its pivotal axis to a forwardly inclined position for pouring and thereafter to a rearwardly inclined position, and mechanism for moving said flap about its pivotal axis to discharge position upon the rearward inclination of said housing.

11. In apparatus for dispensing liquids from sealed cans of perforatable material containing the same, the combination of a magazine for holding a supply of canned liquids and provided with a delivery outlet, delivery gate mechanism for controlling the release of a can from said outlet, can opening and pouring mechanism and transfer means for conveying a can from said outlet to said opening and pouring mechanism, said opening and pouring mechanism comprising a rack for holding a can, a pouring opening blade and a venting blade normally mounted in spaced relation with said can in an axial direction, mechanism for effecting relative movement between said can and said blades, said opener blade being disposed diametrically opposite to said venting blade, and mechanism for tipping said can so as to pour said liquid from its pouring opening and thereafter inclining said can in the reverse direction to thereby prevent dripping from the pouring end.

12. In apparatus for dispensing liquids from sealed cans of perforatable material containing the same, the combination of a magazine having a series of stacks for holding a plurality of species constituting a supply of canned liquids and provided with a delivery outlet for each stack, individual delivery gate mechanisms associated respectively with said outlets for selecting a desired specie from a predetermined stack, can opening and pouring mechanism and transfer means for conveying a can from an outlet of said predetermined stack to said opening and pouring mechanism, said opening and pouring mechanism comprising an outlet of said predetermined stack, a rack for holding a can, a pouring opening blade and a venting blade normally mounted in spaced relation with said can in an axial direction, mechanism for effecting relative movement between said can and said blades, said opener blade being disposed diametrically opposite to said venting blade, and mechanism for tipping said can so as to pour said liquid from its pouring opening and thereafter inclining said can in the reverse direction to thereby prevent dripping from the pouring end.

13. An apparatus for opening and pouring liquid from a can comprising a can support, means operative against the opposite ends of a can held on said support for perforating said opposite ends, means for tipping the can in a direction to cause the contents to pour out of one of the openings produced by said perforating means and thereafter inclining the can in a reverse direction to thereby divert drippings from the pouring end and cause such drippings to follow the surface of the can toward its opposite end.

14. An apparatus for opening and pouring liquid from a can comprising a can support, perforating means operative against the opposite ends of a can held on said support for perforating said ends, said perforating means including a vent punch having a passage extending through it for the discharge of gas when the can is punctured by said punch, means for tipping the can in a direction to cause its contents to pour out of one of the openings produced by said perforating means and thereafter inclining the can in a reverse direction to thereby divert drippings from the pouring end toward the vented end and cause such drippings to follow the surface of the can, the can support including a pair of spaced elements on which the can is rested and which permit drip flow between them along the surface of the can.

15. An apparatus for opening and pouring liquid from a can comprising. a support for the can, means engaging the opposite ends of a can while held on said support, puncturing elements operative against the opposite ends of the supported cans, means operative to cause tilting movement of the can to pour its contents out of one of the openings produced by the puncturing elements, and means for thereafter causing tilting movement of the can in a reverse direction to cause drip from the can to follow the surface of the can and flow in a direction away from the pouring opening.

16. In an apparatus as provided for in claim 15, including spaced means on the support on which the can is rested and which permit drip flow between them, and collection means by which said drip is captured.

17. In apparatus for dispensing liquids from sealed cans made of suitable puncturable material, the combination of a cabinet having a chamber containing means for holding a stack of said cans of liquid to be dispensed, a cup-compartment adjacent to the chamber, cup-dispensing mechanism for delivering individual cups to a receiving station, can-puncturing means for providing a pouring opening at one end of the can and a venting opening at the other end in each can, and pouring mechanism disposed below said can-holding and cup-dispensing means for causing the contents of the can to be poured directly from the pouring opening therein into a cup at said receiving station, means for tilting each can after the pouring operation to catch the drip from the emptied can, means disposed beneath the can-holding means for delivering individual cans to the puncturing and pouring mechanism, and mechanism for operating said cup-dispenser mechanism, can-delivering mechanism, puncturing mechanism, pouring mechanism and can-tilting mechanism in timed sequence once in each operational cycle.

References Cited in the file of this patent

UNITED STATES PATENTS

| | | |
|---|---|---|
| 1,140,676 | Gray | May 25, 1915 |
| 1,434,417 | Ward | Nov. 7, 1922 |
| 1,998,263 | Townsend | Apr. 16, 1935 |
| 2,150,469 | Tozer et al. | Mar. 14, 1942 |
| 2,150,812 | Ankerman | Mar. 14, 1939 |
| 2,279,093 | Peters | Apr. 7, 1942 |
| 2,304,484 | Smith | Dec. 8, 1942 |
| 2,307,378 | Warfield | Jan. 5, 1943 |
| 2,333,118 | Olson | Nov. 2, 1943 |
| 2,380,472 | Shayerson | July 31, 1945 |
| 2,386,152 | Wahl | Oct. 2, 1945 |
| 2,438,050 | Hansen, Jr. | Mar. 16, 1948 |
| 2,602,483 | Graham | July 8, 1952 |
| 2,609,982 | Johnson | Sept. 9, 1952 |